US010558787B2

(12) United States Patent
Pattyn et al.

(10) Patent No.: US 10,558,787 B2
(45) Date of Patent: Feb. 11, 2020

(54) THREAT-MONITORING SYSTEMS AND RELATED METHODS

(71) Applicant: VSK Electronics NV, Harelbeke (BE)

(72) Inventors: Kurt Pattyn, Harelbeke (BE); Wim van Glabeke, Harelbeke (BE); Gerdy Maelbrancke, Harelbeke (BE)

(73) Assignee: VSK Electronics NV, Harelbeke (BE)

( * ) Notice: Subject to any disclaimer, the term of this patent is extended or adjusted under 35 U.S.C. 154(b) by 0 days.

(21) Appl. No.: 15/111,913

(22) PCT Filed: Oct. 30, 2014

(86) PCT No.: PCT/EP2014/073371
§ 371 (c)(1),
(2) Date: Jul. 15, 2016

(87) PCT Pub. No.: WO2015/106849
PCT Pub. Date: Jul. 23, 2015

(65) Prior Publication Data
US 2016/0350519 A1 Dec. 1, 2016

(30) Foreign Application Priority Data
Jan. 17, 2014 (AU) .............................. 2014200318

(51) Int. Cl.
*G06F 21/10* (2013.01)
*G06F 21/60* (2013.01)
(Continued)

(52) U.S. Cl.
CPC .......... *G06F 21/105* (2013.01); *G06F 21/602* (2013.01); *H04L 9/0643* (2013.01);
(Continued)

(58) Field of Classification Search
CPC ....... G06F 2221/2141; H04L 2463/103; H04L 9/0643; H04L 63/0442
See application file for complete search history.

(56) References Cited

U.S. PATENT DOCUMENTS 5,917,912 A   6/1999 Ginter et al.
6,968,384 B1 * 11/2005 Redding ............... G06F 21/105
                                                       705/52
(Continued)

FOREIGN PATENT DOCUMENTS

WO   WO-2002101494   12/2002
WO   WO-2007061730    5/2007
WO   WO-2015106849    7/2015

OTHER PUBLICATIONS

Applied Cryptography, Second Edition by Bruce Schneier; Publisher: John Wiley & Sons, Inc. pp. 36-39. (Year: 1996).*
(Continued)

*Primary Examiner* — Madhuri R Herzog
(74) *Attorney, Agent, or Firm* — Brooks, Cameron & Huebsch, PLLC

(57) ABSTRACT

Disclosed herein are methods, devices, systems and computer-executable instructions for managing software in threat-monitoring systems. One such method comprises receiving a plurality of licence identifiers identifying respective licences available for assignment to a threat monitoring system. The method further comprises receiving a selection of at least one of the licence identifiers. The method also comprises uploading, to the threat monitoring system, an activation tool for activating at least one operational function of the threat monitoring system, the at least one operational function corresponding to the selected at least one licence identifier.

9 Claims, 10 Drawing Sheets

(51) Int. Cl.
*H04L 9/06* (2006.01)
*H04L 9/30* (2006.01)
*H04L 29/06* (2006.01)

(52) U.S. Cl.
CPC ............ *H04L 9/30* (2013.01); *H04L 63/0442* (2013.01); *G06F 2221/0764* (2013.01); *G06F 2221/0771* (2013.01); *G06F 2221/0775* (2013.01); *G06Q 2220/18* (2013.01); *H04L 2463/103* (2013.01)

(56) References Cited

U.S. PATENT DOCUMENTS

| | | | | |
|---|---|---|---|---|
| 7,140,042 B2 * | 11/2006 | Verma | ..................... | G06F 21/10 726/26 |
| 7,890,950 B1 * | 2/2011 | Nanavati | .................. | G06F 8/62 705/51 |
| 8,732,842 B2 * | 5/2014 | Park | ........................ | G06F 21/10 705/51 |
| 9,811,644 B1 * | 11/2017 | Ahmed | .................. | G06F 21/105 |
| 2005/0044546 A1 | 2/2005 | Niebling et al. | | |
| 2005/0268343 A1 * | 12/2005 | Onoda | .................. | G06F 21/105 726/26 |
| 2009/0031432 A1 * | 1/2009 | Wakai | ..................... | G06F 21/10 726/33 |
| 2009/0038018 A1 | 2/2009 | Mikami | | |
| 2009/0292389 A1 * | 11/2009 | Jung | .................. | G05B 19/0426 700/117 |
| 2011/0004945 A1 | 1/2011 | Kurokawa | | |

OTHER PUBLICATIONS

"International Application No. PCT/EP2014/073371, International Search Report and Written Opinion dated Feb. 4, 2015", (Feb. 4, 2015), 11 pgs.

"European Application Serial No. 14796459.7, Office Action dated Oct. 26, 2018", 5 pgs.

* cited by examiner

FIG. 6A

THREAT-MONITORING SYSTEMS AND RELATED METHODS

PRIORITY CLAIM TO RELATED APPLICATIONS

This application is a U.S. national stage application filed under 35 U.S.C. § 371 from International Application Serial No. PCT/EP2014/073371, which was filed 30 Oct. 2014, and published as WO2015/106849 on 23 Jul. 2015, and which claims priority to Australian Application No. 2014200318, filed 17 Jan. 2014, which applications and publication are incorporated by reference as if reproduced herein and made a part hereof in their entirety, and the benefit of priority of each of which is claimed herein.

FIELD OF THE INVENTION

The present invention relates generally to threat-monitoring systems, and more particularly to methods by which scalable functionality can be provided to such systems by the provision of software.

BACKGROUND OF THE INVENTION

A range of threat-monitoring systems are used to protect people and property from harm, loss or intrusion. Such systems include systems to detect fire, smoke, gas and other abnormal environmental conditions, as well as security systems such as surveillance systems, perimeter integrity monitoring systems, intrusion detection systems and access control or the like. Depending on the system requirements, such monitoring systems may be used for either or both of detecting or verifying threats.

Because of the often dire outcomes associated with failure of such systems, there is often a need for these systems to comply with legislative standards for operation. It is therefore not feasible to offer in-field capability upgrades for such systems. If in-field upgradable capabilities are provided, these are typically only able to be manually installed by authorised technicians and thus are difficult and are expensive to perform.

Accordingly, it will be desirable to have systems and methods in place which enable and facilitate in-field upgradability of threat-monitoring systems.

Users of threat threat-monitoring systems may have multiple software licences, and a desire to be able to directly control what software is used on which systems, and when those licences are to be active. The manufacturer, or licensee, of the software, however, may desire use of the software to be controlled so that a user is not able to use a licence to operate the software on more systems than the licence is intended for.

Furthermore, some premises will be confronted with changing security requirements during the lifetime of the monitoring system. For example, in video surveillance systems, additional cameras may be needed, or additional or other video detection and verification services might be required to meet changing the scope of the deployed services. In performance-critical systems, such as threat-monitoring systems, there is an additional challenge that the hardware needs to be validated, so providing an ability to add hardware poses a risk that third party providers can provide non-validated hardware that does not meet performance requirements.

The construction industry is one example of an industry in which changing security requirements pose a challenge. In this industry monitoring systems are typically installed for a certain duration only. Once the contracted monitoring period has expired, the monitoring devices are taken back from the construction site and used for the next construction site project. Typically the next project will have other requirements and needs for services on the monitoring device. Therefore there is a challenge in being able to manage these changing requirements on the monitoring devices(s) in a simple but effective manner.

The inventors of the present invention have also determined that in order and facilitate in-field upgradability of threat threat-monitoring systems it may, in some cases, be advantageous or necessary to implement the upgrading process and its supporting systems in a way that ensures 'fail safe' operation of the systems.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect of the present invention there is provided a method implemented on a computing device to manage software in threat-monitoring systems, the method comprising:

receiving a plurality of licence identifiers identifying respective licences available for assignment to a threat monitoring system;

receiving a selection of at least one of the licence identifiers; and uploading, to the threat monitoring system, an activation tool for activating at least one operational function of the threat monitoring system, the at least one operational function corresponding to the selected at least one licence identifier.

Preferably, the activation tool is specific to the combination of (i) a unique identification code, such as a MAC address or other serial number, of the threat monitoring system and (ii) the selected at least one of the licence identifiers.

Preferably, the method further includes receiving a request to deploy, to the threat monitoring system, the at least one licence corresponding to the selected at least one of licence identifier, wherein the request triggers a step of generating the activation tool and the step of uploading the activation tool. Accordingly, the method may be used to deploy the selected at least one licence to the threat monitoring system in a single step.

Preferably, the step of generating the activation tool is performed by the computing device. In this manner, the activating of the at least one operational function of the threat monitoring system may be achieved in the absence of connectivity between the computing device and a further software management and/or licencing system.

In an embodiment, the method further includes recording (for example by storing on a memory system of the computing device) that the selected at least one licence identifier has been assigned to the threat-monitoring system.

In an embodiment the method further includes displaying a first list indicative of the plurality of licence identifiers identifying respective licences available for assignment to a threat monitoring system. Preferably, before the step of receiving the selection, the method further includes displaying a list of licences that have been assigned to the threat monitoring system. Preferably, after the step of uploading the activation tool, the method further includes displaying an updated list of licences that have been assigned to the threat monitoring system. It is also preferable, that after the step of uploading the activation tool, the method includes displaying an updated list of licences available for assignment to the threat monitoring system, wherein the updated list displayed the name number of licences as the first list, less the number of licences corresponding to the selected at least one licence identifiers.

Preferably, after the step of uploading the activation tool, the method further includes updating at least one database or file that records which, if any, licences have been assigned to the threat monitoring system. In one embodiment, this is achieved by updating a file stored on the computing device. Additionally or alternatively, this may be achieved by sending data to a database that as external to the computing device, such as may be included in a remotely located software management system.

Preferably, the activation tool encodes the unique identification code of the threat monitoring system to limit use of the at least one operational function to the threat monitoring system having the unique identification code. Preferably the activation tool also encodes at least one software application type for providing the at least one operational function. In one embodiment the application type additionally defines one or more dependent applications that must be enabled on the threat monitoring system in order for said at least operational function functions to be activated.

In one embodiment, the activation tool is encrypted. In another embodiment, the activation tool is protected using a cryptographic hashing technique.

In one embodiment, the method includes selecting the threat monitoring system from a plurality of threat monitoring systems by receiving a selected unique identification code of the threat monitoring system from a plurality of stored unique identification codes. Preferably, the plurality of stored unique identification codes are stored on a memory system of the computing device.

In one embodiment the licence identifiers are define of a licence type and a licence identification code, wherein each of the plurality of licence identifiers uniquely define different licences. The licence preferably defines at least a type of software application type and a license duration, e.g. a defined finite duration or an unlimited duration (perpetual licence).

In one embodiment, the received plurality of licences are registered with an account associated with the threat monitoring system. Such licences are generally already paid-for licences. Generally each of these licences can only be used on one threat monitoring system at a time. The received plurality of licence identifiers may be received from a remotely located server. Preferably the computing device is configured to store, on a memory system of the computing device, the received plurality of licence identifiers. By having the plurality of licence identifiers stored on the memory system of the computing device, the activation tool can be generated after communication with the remotely located server has ceased.

Start-Up Licencing

In one embodiment, the licences may be dynamically derived, as needed, in order to enable initial activation of the at least one operational function. In one embodiment, the licence type characterises the licence as being a licence for initial or activation only. This may be required if a registered licence has not previously been established or downloaded to the computing device, but there is a desire to, at least temporarily, start-up operation. In one embodiment, the licence data includes time data for defining a limited time for use after the initial activation. In an embodiment, at the expiry of the limited time, the threat monitoring system ceases to have the operational function unless the threat-monitoring system receives further licence data to extend the duration of permitted use. Thus, the method may further include uploading the further licence data to the threat monitoring system.

In one embodiment, the step of uploading the uploading can be achieved remotely from the threat monitoring system. For example, the uploading may be performed by a Transmission Control Protocol (TCP) communication, such by using the File Transfer Protocol (FTP) or a proprietary protocol.

Licence Revocation

In a second aspect of the present invention there is provided a method implemented on a computing device to manage software in threat-monitoring systems, the method comprising:

receiving a plurality of licence identifiers identifying respective licences that are assigned to a threat monitoring system;

receiving a selection of at least one of the licence identifiers;

transmitting a request to the threat-monitoring system to un-install software corresponding to the selected at least one of the licence identifiers; and receiving, from the threat monitoring system, uninstall-data for verifying that the software has been un-installed.

In one embodiment, the method further includes verifying, based on the received un-install data, that the uninstallation has been performed. In another embodiment, the method includes transmitting the un-install data to a software management server Preferably, the method includes protecting the transmitted un-install data, for example by encrypting the data or using a cryptographic hashing technique.

In one embodiment, the method further includes transmitting data to a software management server to indicate that the software has been uninstalled.

In one embodiment, the method further includes re-assigning a licence corresponding to the uninstalled software to another threat-monitoring system. In this case, the case the re-assignment is preferably performed according to the method of the first aspect of the present invention, wherein the selected at least one of the licence identifiers, from the first aspect of the invention, includes a licence identifier corresponding to at least an operational function of the uninstalled software.

Transfer Mode

In a third aspect of the present invention, there is provided a method for managing software in threat-monitoring systems, the method comprising:

receiving one or more licence identifiers identifying respective licences available for assignment to a first threat monitoring system; and uploading, to the first threat monitoring system, an activation tool for activating at least one operational function of the first threat monitoring system, the at least one operational function corresponding to the one or more licence identifiers;

wherein, in the event that the one or more licence identifiers are already assigned to a second threat monitoring system, the method further includes generating an alert unless, at the expiry of a specific time limit, software corresponding to the one or more licence identifiers has been verified to have been uninstalled from second threat monitoring system.

Preferably, the method further includes uninstalling the software already assigned to a threat monitoring system using a method in accordance with the second aspect of the present invention. In one embodiment, the one or more licence identifiers are selected by selecting a unique identification code corresponding to the second threat monitoring system. In one embodiment, the one or more licence identifiers correspond to all licence identifiers licenced to the second threat monitoring system.

In the embodiments of the invention described herein, the operational functions may correspond to auxiliary functions, the auxiliary functions being functions that are in addition to a core function of the monitoring systems.

In a fourth aspect of the present invention there is provided a method of managing software in threat-monitoring systems, wherein the method comprises the method according to the first aspect of the present invention and further comprising activating the at least one operational function on the threat monitoring system.

In a fifth aspect of the present invention there is provided a method of managing software in threat-monitoring systems, wherein the method comprises the method according to the second aspect of the present invention and further comprising uninstalling the software from the threat monitoring system.

In a sixth aspect of the present invention there is provided computer executable instructions which when executed by a computing device or system configure the device or system to perform a method of the invention described herein.

In a seventh aspect of the present invention there is provided a computing device configured to perform the first of second aspect of the present invention.

The computing device may be configured to communicate with the software management system via the Internet. The computing device may be configured communicate with said threat-monitoring systems via a Local Area Network (LAN).

The computing device referred to hereinbefore, in relation to any of the aspect of the invention, may advantageously be a portable computing device, such as a laptop, notebook, tablet, smart-phone or a custom-made portable computing device.

In an eighth aspect of the present invention there is provided a method for expanding functionality in a threat monitoring system, the method comprising:

receiving licence data including a protected hardware identification number;

reading a unique identification number from an item of hardware that has been added to the threat monitoring system to expand the functionality of the threat monitoring system;

in the event that the hardware identification number matches the unique identifier, generating a permission parameter for enabling operation, on the threat monitoring system, of software for operating said item to perform said function.

The hardware identification number may be protected by, for example, encryption or by a tamper-proofing technique, such as a cryptographic hashing technique.

In one embodiment, the licence data further includes a protected type parameter for indicating a licenced operational function associated with the item of hardware. Additionally or alternatively, the licence data may further include protected operational parameters for using the item of hardware.

In one embodiment the hardware identifier is protected by being encrypted. In another embodiment, the hardware identifier is protected by the application of a cryptographic hashing technique, as has been exemplified herein, or by some other technique to guard against tampering.

In one embodiment, the permission parameter activates software that is already present in the threat monitoring system.

In one embodiment, the threat monitoring system is a video monitoring system, such as a surveillance system.

In a ninth aspect of the present invention, there is provided a threat monitoring system configured to perform the method according to the eighth aspect of the invention.

In a tenth aspect of the present invention there is provided a kit for expanding functionality in a threat monitoring system, the kit including a memory that stores licence data, and an item of hardware for adding to the threat monitoring system to expand the functionality of the threat monitoring system, the item of hardware having a computer-readable unique identification number. Preferably, once the installing the item of hardware into the threat monitoring system and threat monitoring system is configured to receive the licence data, the threat monitoring system is configured to perform the method according to the eighth aspect of the present invention.

In a further aspect the present invention provides a software management system configured to manage software distribution to a threat-monitoring system. The software management system including:

an un-installation component configured to receive an un-installation message pertaining to a set of software instructions from a threat-monitoring system; and to verify un-installation of the set of software instructions from the un-installation message; and to cause cessation of a financial transaction relating to the use of the set of software instructions upon verification of the un-installation message.

For this aspect of the present invention and for the second aspect of the present invention, the method may comprise un-installing (e.g. by deletion or de-activation) software instructions configured to enable the performance of an auxiliary functionality by the threat-monitoring system that is a functionality additional to a core functionality of the threat-monitoring system, the method including preventing un-installation of first software instructions configured to enable the threat-monitoring system to perform a core functionality.

The method can include transmitting an un-installation message to a remotely located software management system; the un-installation message including:

an encrypted message comprising un-installation data representing at least one or more of a set of second software instructions, and a device from which the set of second software instructions are being un-installed.

The encrypted message can be formed by applying a one-way function to the un-installation data. Additionally or alternatively, the encrypted message can be formed by encrypting a message using a public key of a public-private key pair, the private key belonging to the remotely located software management system.

The encrypted message comprising un-installation data can be formed either upon receipt of a command at the threat-monitoring system to uninstall the second software instructions or upon installation of the encrypted message comprising un-installation data.

In one form, uninstalling software instructions include any one or more of:

changing, adding, replacing or removing at least part of the second software stored in the detection system. Uninstalling can additionally or alternatively include authorising activation or deactivation of second software instructions; or de-authorising activation or causing deactivation of second software instructions.

Most preferably this is performed without affecting the first software instructions.

Therefore, as un-installation may be achieved by deactivating, rather than removing, the software instructions, it would be understood by a person skilled in the art that "uninstalling" software instructions need not require a physical removal of the software instructions (e.g. an executable file) from the threat-monitoring system.

Also described herein is a threat-monitoring system of the type including:

a data processing system configured to receive monitoring data from a sensing subsystem; and to operate in accordance with software instructions to provide an output indicative of at least one monitored condition or operational condition, wherein said software instructions are upgradable after installation of the system.

In a preferred form, software instructions comprise first software instructions configured to control the system to provide an output indicative of a monitored condition. Said first software instructions will typically be default first software instructions operational at installation of the system. The software instructions can further comprise second software instructions configured to control the system to provide one or more auxiliary functions.

Most preferably the first software instructions are protected during upgrade of the second software instructions. The first software instructions can be protected by only enabling upgrade of the software instructions with software instructions authorised by an authorising party. The authorising party may be, or act under authority of, a product manufacturer or standards body.

Second software instructions are preferably upgradable in the field.

The threat-monitoring system preferably includes a network interface via which the threat-monitoring system can connect to a communications network. The network interface can be used to connect the threat-monitoring system to a remotely located software management system.

In one form, upgrading software instructions includes any one or more of:

changing, adding, replacing or removing at least part of second software instructions stored in the detection system.

Upgrading can additionally or alternatively include authorising activation or deactivation of second software instructions; or de-authorising activation or causing deactivation of second software instructions.

Preferably this is performed without affecting the first software instructions.

Further described herein is a method relating to a threat-monitoring system, said method including:

upgrading software instructions stored on the threat-monitoring system to enable performance of an auxiliary functionality, said auxiliary functionality being a functionality additional to a core functionality of the threat-monitoring system.

In one form, upgrading software instructions include any one or more of:

changing, adding, replacing or removing; at least part of second software stored in the detection system. Upgrading can additionally or alternatively include authorising activation or deactivation of second software instructions; or de-authorising activation or causing deactivation of second software instructions.

Most preferably this is performed without affecting the first software instructions.

The method can include sending a request to a software management system for distributing software to a threat-monitoring system;

receiving data comprising software instructions including second software instructions.

The method may additionally include receiving licensing data corresponding to received software.

The method can include, selecting an auxiliary functionality currently unable to be performed by the threat-monitoring system and initiating upgrading of the software instructions stored on the threat-monitoring system. The selection can be performed via a user interface forming part of the threat-monitoring system or a control system related to it.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

Illustrative examples of the present invention will now be described by way of non-limiting example only with reference to the accompanying drawings. In the drawings:

FIG. 6a illustrates a web page or program interface for managing software licences associated with a user account;

DETAILED DESCRIPTION OF THE EMBODIMENTS

Figure 1:
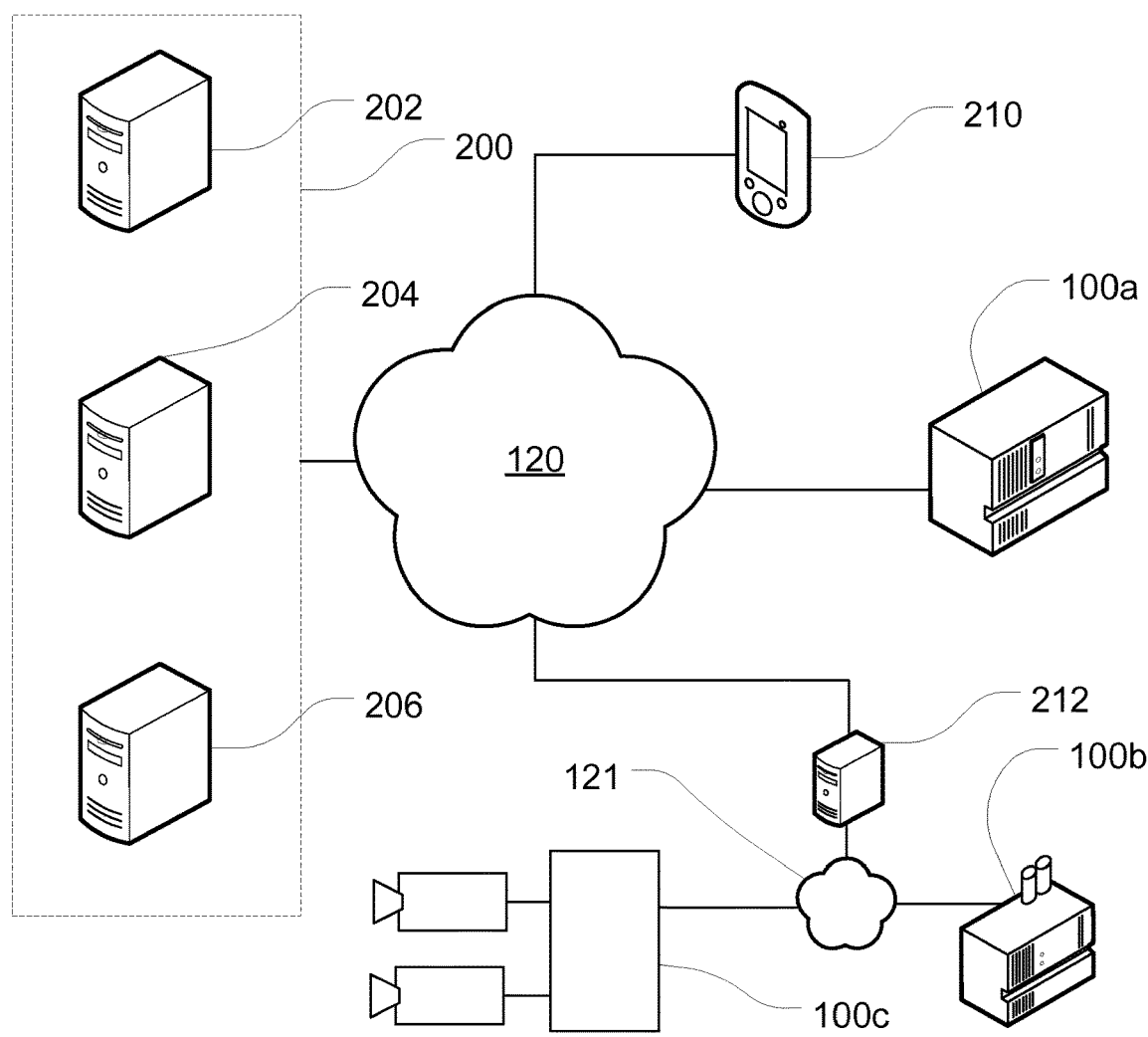
FIG. 1 illustrates the overall architecture of software distribution system including a software management system and a plurality of threat-monitoring systems.

FIG. 1 illustrates a network layout and plurality of threat-monitoring systems. The network includes a software management system that can be used to distribute software to any one or more of a plurality of threat-monitoring systems in order to maintain or upgrade those systems.

The threat-monitoring systems 100a, 100b and 100c could for example be sensor systems such as smoke, gas, fire or other device for sensing an environmental condition which can indicate either that a hazard exists or other abnormal or unwanted conditions exists. The threat-monitoring systems 100(a,b,c) could alternatively be a security system such as a video security or surveillance system, infrared detection system, perimeter monitoring, other intrusion monitoring system, or the like. Additionally, the threat-monitoring systems 100(a,b,c) could represent a control system for controlling other threat-monitoring systems, such as a fire alarm control panel or access control panel or the like.

Figure 2:
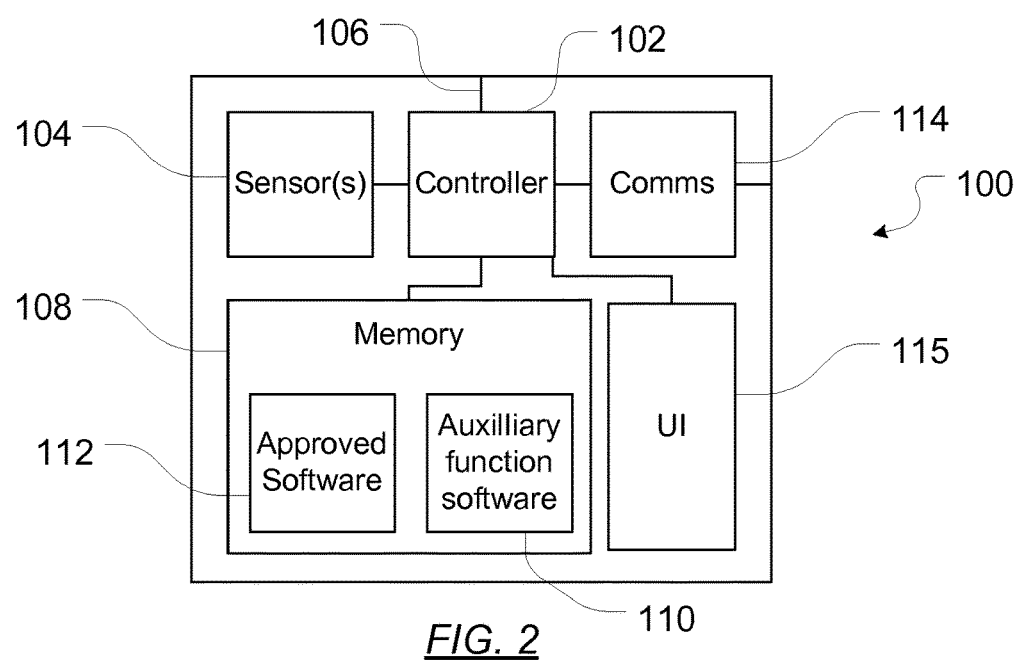
FIG. 2 illustrates a threat-monitoring system which can implement an embodiment of the present invention.

FIG. 2 is a block diagram showing the main functional blocks of a threat-monitoring system 100 (which may be any one of threat-monitoring systems 100a, 100b, 100c).

The system 100 includes a central controller 102 which operates under control of software instructions to control the operation of the threat-monitoring system. Inputs of a condition being monitored can come from a sensing subsystem comprising either a sensor 104 which may form part of the threat-monitoring system 100 (e.g. a smoke sensing chamber of a smoke detector, or a video camera of a video security or surveillance system) or an external sensing subsystem. In the case of an external sensing sub-system sensing inputs are received via an input/output port 106 (e.g. a fire alarm control panel that receives smoke detector output signals via a fire alarm loop or other network, or security system that receives a video feed from one or more cameras).

The controller 102 receives and processes the output of its associated sensors and outputs a signal in accordance with the software instructions stored in memory 108. The output signals will be indicative of either the sensed condition or possibly an operational condition of the threat-monitoring system or component thereof. Some of the functionality performed by the controller will relate to the underlying operability of the threat-monitoring system and is essential for its correct operation, such as controlling interfaces, standards-essential processing of sensor outputs or processing of sensor outputs to minimum specified parameters or other functions be related to the detection or notification of alarm or threat conditions. These functions are implemented by a first portion of the software instructions stored in the memory termed herein "approved software" 112. In addition to these core functions, the present inventors have determined that it may be advantageous to offer advanced functionality of such devices. This might include monitoring complimentary conditions such as additional chemical species, or performing additional sensor signal analysis or reporting of events or measured signals. In the case of video monitoring, the advanced functionality may be the addition of additional video channels, which enable the expansion of the video monitoring system to accommodate additional cameras. In order to perform these more advanced or expanded functions, the memory is configured to store a second type of software instructions, termed "auxiliary functions software" 110 in memory 108. In one form the auxiliary functions software can be likened to downloading an application or plug-in on a general purpose computing device, or upgrading a version of a software application with upgraded functionality. To illustrate more concretely auxiliary functions software could (but should not be considered to be limited to) offer the additional functionality on the following exemplary threat-monitoring systems:

| Threat-monitoring system type | Additional functionality (threat-monitoring function) added by provision of additional function software |
|---|---|
| Smoke detector | Extra alarm thresholds<br>Advanced airflow monitoring algorithms<br>addition of a gas sensing module |
| Gas sensor | Calibration data relating to new gas species |
| Video security systems | New video motion detection algorithms<br>New zero motion detection algorithms<br>Processing of extra video channels<br>Algorithms for video verification of smoke |
| Intrusion protection | Routines to provide discrimination between object types, e.g. humans and other objects, animals etc. |
| Access control system | User recognition systems, e.g. facial feature recognition etc. |

The threat-monitoring system 100 additionally includes communications module 114 which is used for communicating with external devices. For example, communications module can enable the system 100 to connect to the internet or other communications networks such as a proprietary network for communicating with other threat-monitoring systems or a local area communications networks, by either physical or wireless transmission mediums.

The threat-monitoring system also includes a user interface, through which users receive information from the threat-monitoring system and provide control inputs to the system 100. The UI can include, but is not limited to, the following interface elements:

touch screen, keyboard, display, illuminated indicator, button, keys, switch, touchpad, joystick, audio transducer, data or signal output jack or port, or any combination or array of such elements.

Returning now to FIG. 1, the threat-monitoring system 100(a,b,c) is configured such that they can connect, via their respective communications modules, to a communications network 120 (e.g. the internet) in order to allow them to receive upgraded software from a software management system 200. Threat-monitoring systems 100b and 100c do not directly connect to the network 120, but instead connect through a central control system 212. The central control 212 system may monitor the individual threat-monitoring systems 100b and 100c and allow user control over them, but may also (as described below) perform a role in control of the download, installation and/or licensing of software instructions to the threat-monitoring systems 100b and 100c.

The central control system 212 and the threat-monitoring systems connected to it may be part of a common Local Area Network (LAN) 121 or other private network, such as an Ethernet or private Wi-Fi network. This enables the central control system 212 to maintain operability with its connected threat-monitoring systems during temporary disconnection between the central control system 212 and the communications network 120. Such temporary disconnection may occur if the communications network is a network external to the private network, for example where the communications network 120 is the internet.

In this example, the software management system 200 comprises:

a software storage server 202 on which files representing software able to be uploaded to the threat-monitoring system 100;

a licensing and software management server 204 which is adapted to control the software updating process, issue licences to enable activation of software downloaded to a threat-monitoring system 100(*a,b,c*) from the software storage server 202 and a financial transaction server 206 which is configured to process financial transactions relating to the supply and distribution of the software.

It should be noted that the software management system 200 may not comprise all components illustrated in this example, but merely comprise a computer system configured to control the software distribution process, using external servers and data storage facilities.

In order to upgrade software on one of the threat-monitoring systems 100(*a,b,c*) a request is sent to the software management system 200, identifying a software item to be installed and/or activated on a particular threat-monitoring system 100(*a,b,c*). The request can be made directly from the threat-monitoring system 100(*a,b,c*) on which the software is to be installed and/or activated using the user interface of the threat-monitoring system or from an external device such as terminal 210. The terminal 210 could for example be a remote monitoring station connected to the threat-monitoring system 100(*a,b,c*) or be stand-alone computer, laptop computer, tablet computer, telephone (including smart phone), personal digital assistant or other computing device, for example such as might be used by a technician or other person to control the configuration of, or use, the threat-monitoring system 100(*a,b,c*) remotely. Terminal 210 may also be brought on-site to communicate directly with the threat monitoring system 100(*a,b,c*) directly or through a LAN 121 to which the threat-monitoring system 100(*b,c*) is connected. Accordingly terminal 210 may be operated by a third party technician or installer who normally works off-site from the monitoring system 100(*a,b,c*), but can come on-site if there is no communication between the threat-monitoring system 100(*a,b,c*) and the publically accessible network 120, or if manual interaction with the hardware of 100(*a,b,c*) is required.

Each of terminal 210 and central control system 212 are also referred to herein as a "computing device" or "software management device" which can be used to perform various functions of the software management system 200.

In one arrangement described herein, the software management device 210, 212 operates a web page hosted by the software management system 200. The web page allows the technician to access a customer account associated with one or more of the threat monitoring systems 100(*a,b,c*) to send the request for a software upgrade to the software management system 200.

In another arrangement described herein, the software management device 210, 212 can run a software application that enables the software management device 210, 212 to perform some or all of the functions of the software management system 200, including, but not limited to, all of the functions that may be performed via the webpage. However, in many cases, some of these functions still require partial involvement of the software management system. For example the software management system 200 acts as a centrally managed repository for the customer's account details and financial transactions, and stores all of the latest software releases for the threat monitoring systems. In contrast with software management devices 210, 212 operated by a technician, the software management system 200 is generally managed by the software provider or distributor from whom the software is purchased, and is therefore responsible for issuing new, account-linked and paid-for software licences.

Once the request for a software upgrade is received the software management system 200 processes the request according to one or both of:

business rules specifying, for example, licensing fees and requirements for use of the software; and technical rules, specifying for example, technical or standards based conditions for the provision and use of software to the requested threat-monitoring system.

Different embodiments of the present invention can use different mechanisms for performing the transfer of a requested software application data to the threat-monitoring system 100. Three such examples will now be described in connection with FIGS. 3 to 5. As will be appreciated, each may constitute a separate inventions.

Update Process 1

Figure 3:
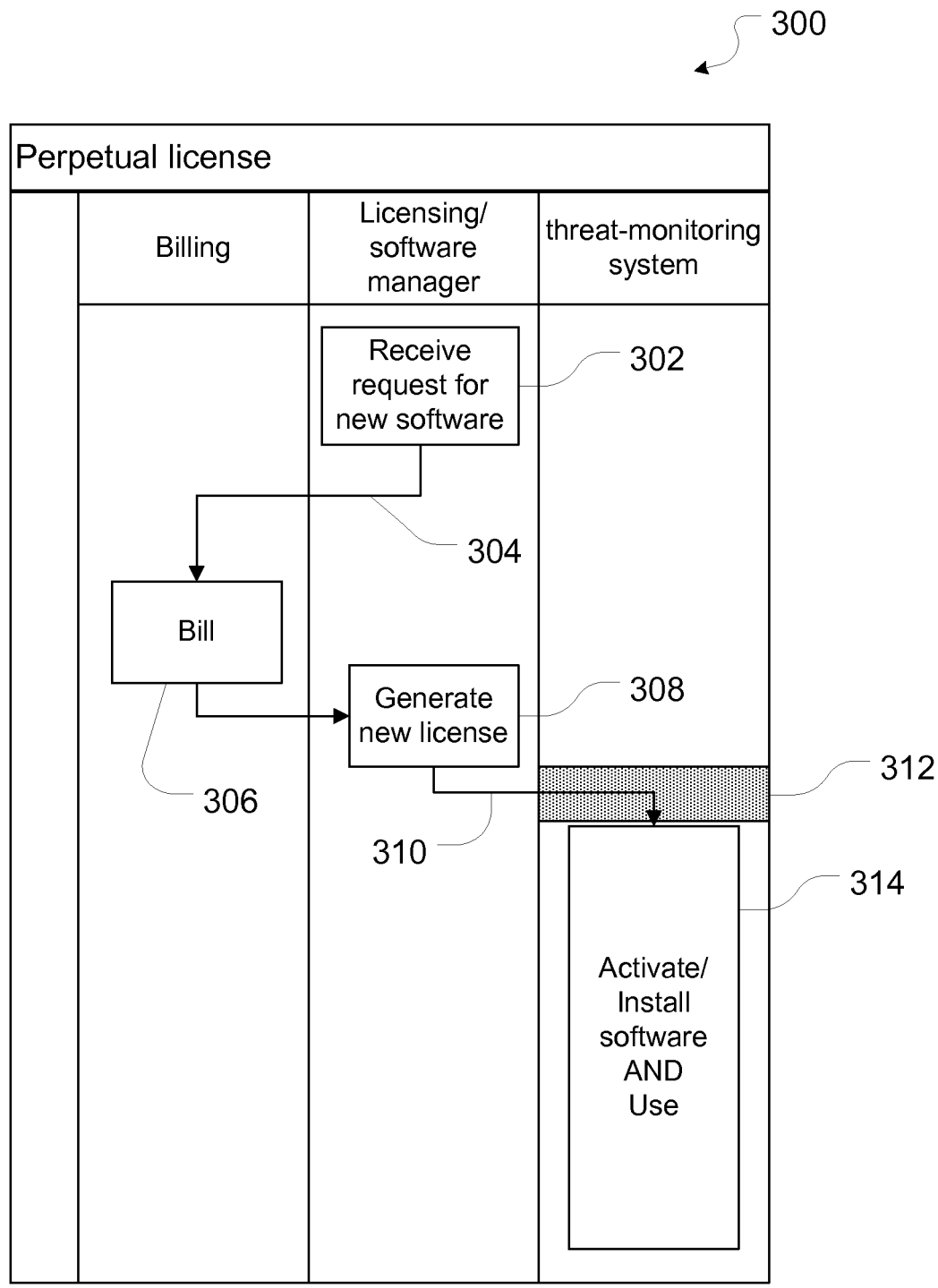
FIG. 3 illustrates a process for perpetual licensing of upgrade software in an embodiment of the present invention.

FIG. 3 illustrates a swim lane diagram indicating a process for transferring a software application to a threat-monitoring system. In this example the software is supplied according to a perpetual licensing model. This process is divided into three key participants, namely the threat-monitoring system in the right most column, and a software management system in the form of software distribution manager and licensing system in the central column, and a billing/transaction system in the left most column. Although the billing/transaction system is described as separated from the software distribution manager and licensing system, this is simply for clarity of explanation, and is not intended to require these systems to be separate.

In an initial step 302 in the method 300 the licensing and software manager receives a request for software to be delivered to the threat-monitoring system. The request may come from either the threat-monitoring system directly via communications network or via a request made at an external terminal such as the terminal 210 of FIG. 1. The licensing and software manager processes the request and instructs 304 the billing system to perform a financial transaction to bill the requestor for the software to be delivered to the threat-monitoring system. The request may include financial account details to allow immediate processing of the transaction, or billing details to allow post-delivery processing of the transaction, alternatively the billing system can store financial account details and receive a customer identifier or system identifier to enable processing the transaction according to the stored data. Once billing is performed in step 306, the software management system 200 generates a licence, which may be represented by a licence ID. The software management system 200 or software management device 210, 212 can then generate at step 308 an activation tool from the licence and a unique ID of the threat monitoring system 100(*a, b* or *c*) for which the licence is to be used. The licence tool is used to enable a specific functionality (as defined by the licence) on that threat monitoring system. The activation tool may, for example, include any required software (or cause the downloading of such software onto the threat-monitoring system) or include data that enables such software to be run on the threat-monitoring system. The activation tool may also therefore also encode details of the licence which may need to be known to the threat-monitoring system.

The activation tool is then transferred to the threat-monitoring system in step 310. This may be performed via a communications network such as network 120 or LAN 121 but may additionally be performed by manual process such as transferring the application software and licensing information on a memory means such as a USB drive or other transportable memory system. In the network enabled process, it should be noted that the threat-monitoring system may not be permanently connected to the software management system 200 during the time period represented by shaded block 312, during which the data need to be transferred to the threat-monitoring system.

In one embodiment, once the application and licensing data is delivered to the threat-monitoring system, it can be installed either by manual initiation by a user or automatically by the controller of the threat-monitoring system at step 314. The installation process typically includes a process by which the threat-monitoring system checks whether the software being used is correctly licensed. In the perpetual licence model, only a one off licensing fee is charged by the billing system and the user of the software has freedom to use the software on their threat-monitoring system in accordance with the licence, without further payments being made. Removal or deactivation of the auxiliary software can take place freely.

In an particularly advantageous arrangement, the application and licensing data is pushed onto the threat monitoring system by terminal 210 or central control system 212 or other similar computing device running propriety software management software. Further, using the software management software, the computing device 210, 212 can be configured to store one or more of the software provider's latest software releases, a list of account-linked licences registered with client and a list of threat monitoring systems (e.g. as identified by their unique ID codes) associated with the client's account. Such local data may be downloaded from the software management system 200 when there is a communication between the computing device 210, 212 and the software management system 200. This data may be stored in a cache or other memory of the computing device 210, 212. This local data storage enables the computing device 210, 212 to activate the auxiliary software on monitoring systems 100(*a,b,c*) even during periods in which there is no communication between any of the systems 100(*a,b,c*) and the software management system 200. In the case of computing device 210, the activation can be achieved by on-site visit if communication with the threat-monitoring system 210, 212 cannot be established. The process of generating and installing an activation tool from the licence and threat-monitoring ID may be used for any of the methods or processes described herein. The process is described in further detail in later parts of this specification.

Process 2

Figure 4:
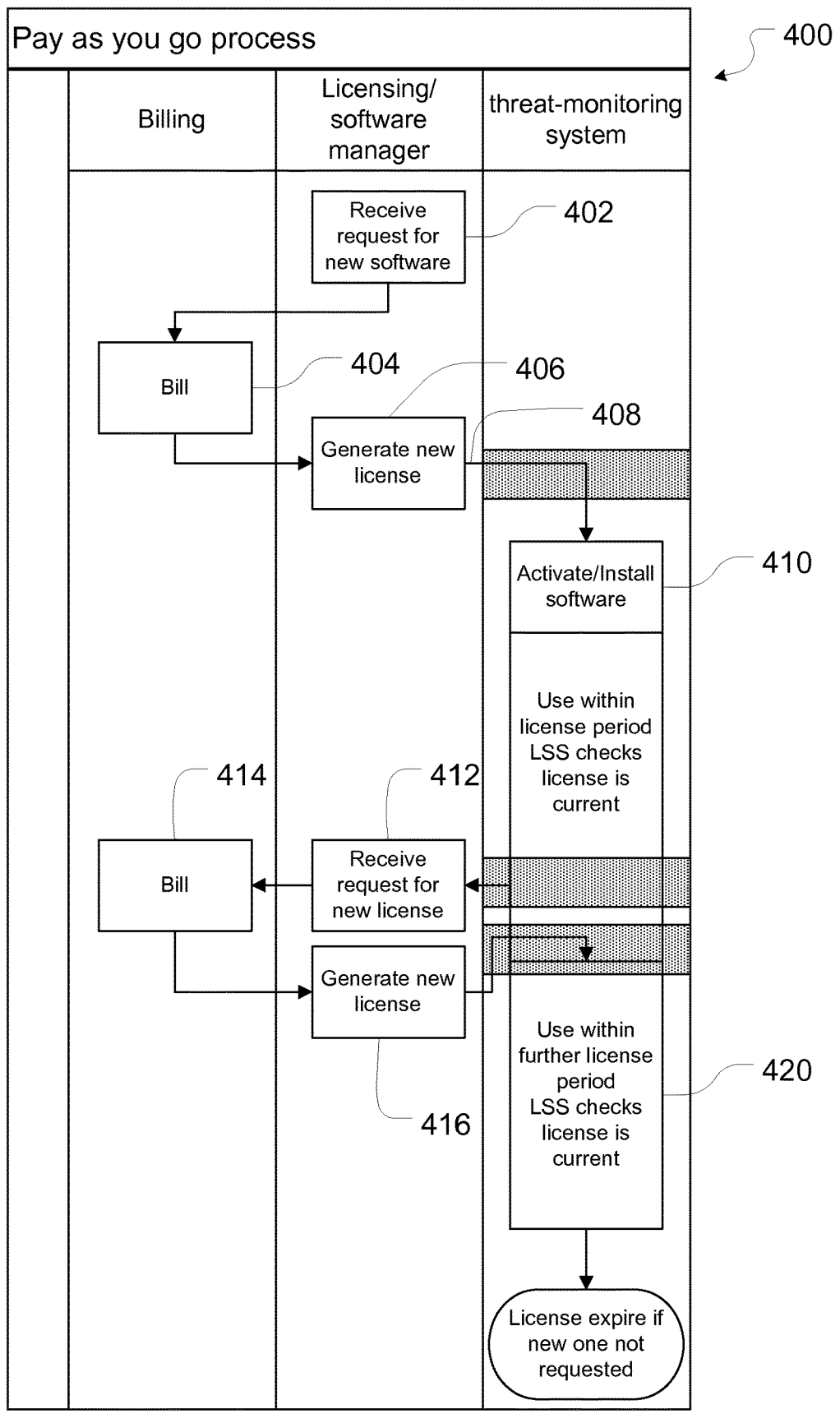
FIG. 4 illustrates a process for 'pay as you go' licensing of upgrade software in an embodiment of the present invention.

FIG. 4 illustrates a swim lane diagram indicating a process 400 for transferring a software application to a threat-monitoring system. In this process, the threat-monitoring system's ability to use the upgraded software is dependent upon paying a recurring licence fee.

In order to implement such a licence fee structure, the auxiliary software is configured to have fixed a period licence which will expire after a set time period. Before the end of the expiry of this licence period, the user of the threat-monitoring system must renew the licence, or else the upgraded software will be disabled. As will be appreciated, in order for the system to 'fail safe' the software can be configured such that only the auxiliary software functionality is disabled upon expiry of the licence and not the approved software also.

As illustrated in FIG. 4 the initial step is the receipt of a request for upgraded software for use by a threat-monitoring system at the software distribution manager and licensing system. Prior to provision of the software and issuance of a fixed time licence for that software, the software distribution manager and licensing system causes the billing system to bill the user in the manner noted above. Next in 406 once billing is completed, the software distribution manager and licensing system makes the new licence information available for access from computing device 210, 212. The activation tool may then be generated and sent to the threat monitoring system in step 408.

In step 410, the threat-monitoring system uses the activation tool to activate the software, as described elsewhere in this specification. This initial licence lasts for some predetermined period of time. Before the end of the licensing period it is necessary for the use of the threat-monitoring system to acquire a new licence. In this example, this is performed by the owner of the threat-monitoring system sending a request for a new licence. This can be performed either from the threat-monitoring system itself or via a remote computing device, such as device 210. The request for the licence is received by the software distribution manager and licensing system at 412 and a transaction is then processed at 414 by the billing system, before generation of a new licence at 416. The new licence is then sent back to the threat-monitoring system and a further licence period 420 begins.

In the event that the licence is not renewed, access to the upgraded auxiliary functionality can be stopped by the threat-monitoring system, either automatically or, where appropriate, by manual intervention.

As noted above, for the most part, the threat-monitoring system need not have constant connectivity to the software distribution manager and licensing system, but only intermittent connectivity. In this way the data communications system of the threat-monitoring system may be dedicated to performance of core functionality, which may in some include cases life-safety functionality. The core functionality may include, for example, as transmitting sensor outputs, data or alarm information to an external device or monitoring station.

In order to facilitate this, it is preferable that the threat-monitoring system need not revert to the software distribution manager and licensing system or other remote system to check licensing credentials for its downloaded software, but instead to perform this function locally.

The local licence authentication scheme can be based on a known duration of the licence and a comparison with the system clock of the threat-monitoring system. In this regard, at the time a licence is issued, the licence expiry will be known or can be determined. The local authentication process can therefore compare the current time to the expiry time of the licence and in the event that the current time exceeds the expiry time, the licence is determined to have expired and the software will cease to operate.

In order to prevent circumvention of the licence checking process by adjustment of the system clock backwards, thereby avoiding an approaching licence expiry time, the licence authentication process can also be configured to compare the current clock time to a previously recorded maximum clock time. In the event that the current clock time is not within a predetermined period of the maximum clock time, a clock fault is determined to have occurred. Upon detection of a clock fault of this type, the software can either be deactivated or a fault counter incremented. Each time a clock fault occurs the counter will be incremented (or decremented) up to (down to) a threshold value. Once the threshold is passed the software will be deactivated.

This process of checking the maximum recorded time against the current time ensures that the clock in the threat-monitoring system is not 'wound back' in order to extend the effective life of the software licence.

In some systems, e.g. sophisticated or large scale systems that comprise multiple threat-monitoring subsystems that may have downloaded auxiliary software (e.g. such as might be represented by the combination of control system 212, and systems 100b and 100c) a privately managed licensing server, such as a local licensing server, can be provided. In such systems the private licensing server can be configured to manage all licensing for devices in its network. In such a system, each individual threat-monitoring subsystem 100b, 100c does not manage its own licensing or verification directly with the software management system, but delegates this process to an enterprise level licensing server, such as may be run by the central control system 212.

In this case, licence renewal or revocation processes are performed under control of the private licensing server, rather than each threat-monitoring system connecting directly to an external software management system. In a preferred form, the private licensing server can maintain a pool of valid licences for software used by its corresponding threat-monitoring subsystems 100b, 100c which can be issued to the subsystems as needed. Alternatively the private licensing server can obtain new licences and/or software instructions from the centralised licensing system on demand as new software instructions are downloaded and installed to threat-monitoring subsystem 100b, 100c.

When operating software management through a local licensing server, there may be instances where the local licensing server is unable to connect to the software management system or at least the licensing control component thereof, to allow it to obtain required licences. This problem can be addressed by allowing the local licensing server to enter a "grace period mode" in which it can issue temporary licences to allow operation of the downloaded software instructions for a period. If this grace period expires without re-establishment of connectivity to the software management system the grace period will be ended and the licences revoked.

An individual threat-monitoring system, which connects directly to the software management system could also be configured to operate in a similar fashion with a limited licence grace period (or periods) in the event that it cannot reach the software management system when needed.

For the initial installation (step 410), the local licensing server 212 can generate a temporary licence, which is intended to provide a finite, but short duration licence, e.g. 30 days, to allow a time window for the user to establish and install an account-linked licence that is registered with the software management system 200. This mode of operation may also be used to initiate a functional software upgrade using any of the other processes described herein. Operation of the temporary licence mode is discussed in further detail elsewhere in the specification and is referred to herein as "start-up licensing"

Process 3

Figure 5:
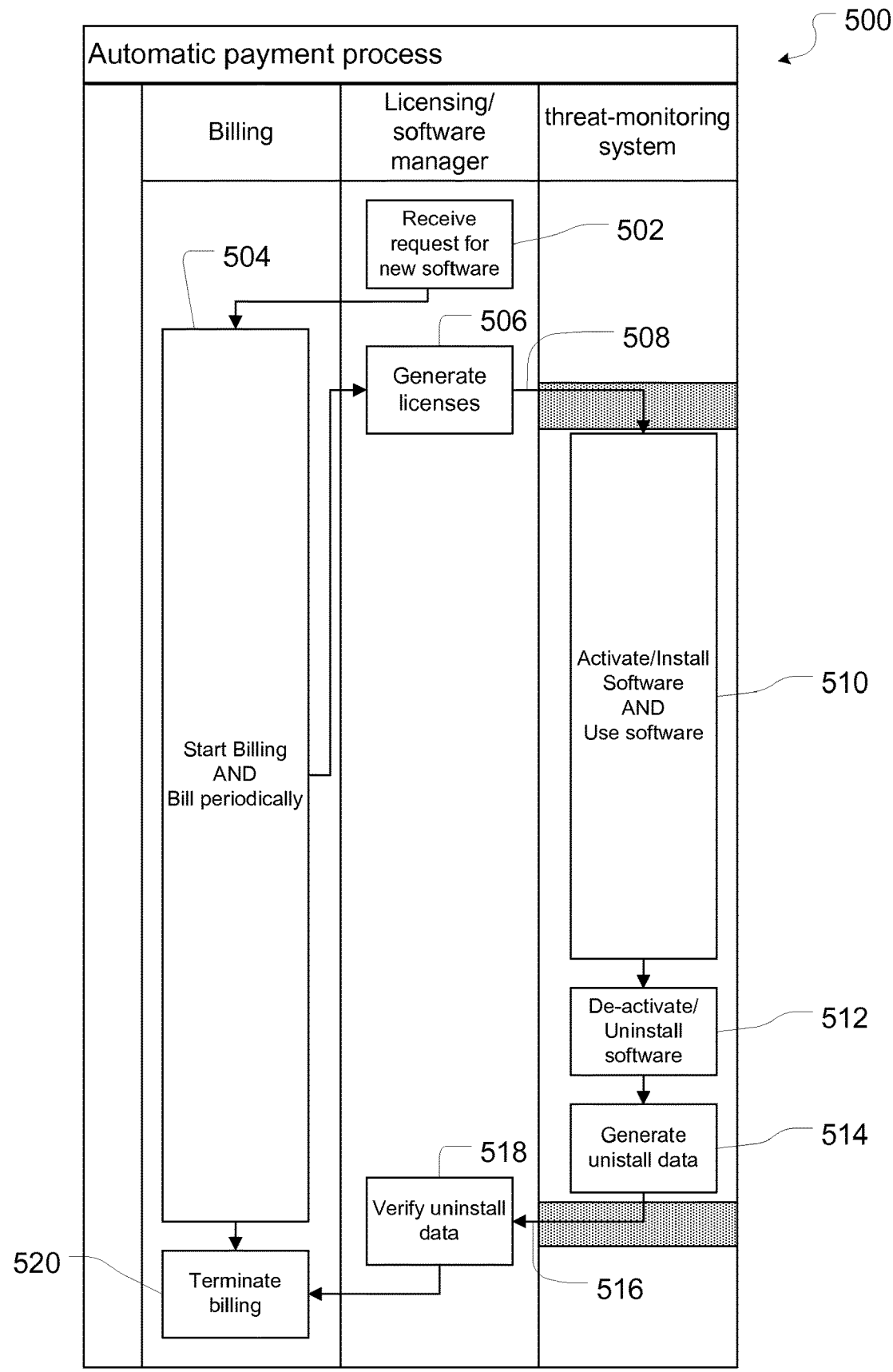
FIG. 5 illustrates an automatic payment process used in a preferred embodiment of the present invention.

The pay-as-you-go model of process 2 is not necessarily optimum for security or life safety situations, as it would be desirable to have a system in which the software of the threat-monitoring system is never disabled due to licensing arrangements. However, it is also desirable that the licence fees are timely paid to the software vendor. FIG. 5 illustrates a swim lane diagram indicating a process 500 for transferring a software application and providing licensing to a threat-monitoring system that meets these two requirements.

The process 500 begins by receipt of a request for upgraded software being received at software distribution manager and licensing system in step 502. The software distribution manager and licensing system initiates a billing process 504 under which automated billings by (preferably) either direct debit or other direct payment means are begun, and performed periodically. Upon establishment of the payment relationship the activation tool is staged for delivery to the threat-monitoring system and an appropriate licence is generated.

The activation tool is then transmitted at 508 to the threat-monitoring system. At step 510, the threat-monitoring system uses the activation tool to enable the functionality associated with licence. The user of the threat-monitoring system can now use the upgraded software as required.

As time passes, the owner of the threat-monitoring system will be billed or automatically charged periodically by the billing system until the software is un-installed from the threat-monitoring system.

In the event that the user of the threat-monitoring system chooses to un-install the downloaded software, it is necessary to perform an un-install process and 512 generate an un-install data 514 at the threat-monitoring system. This un-install data is then transmitted at step 516 back to the licensing and software manager which verifies in step 518 that a valid un-installation has been performed. If this is the case the billing relationship is terminated at step 520.

As can be seen, a licensed user of the threat-monitoring system that either fails to notify the software distribution manager and licensing system of the un-installation of the downloaded software or sends corrupted or falsified un-installation data, will continue to be billed for the upgraded software until full un-installation and correct notification of that un-installation takes place. From the perspective of the software management system 200, the software will be considered to still be 'in use'.

In order to prevent falsification of un-installation data, the un-installation data is created according to a secure algorithm known only to the software distribution manager and licensing system and threat-monitoring system. In a preferred form, upon selection of an 'un-install' command in respect of a software application, at the threat-monitoring system or other control system, the threat-monitoring system performs an uninstall process as follows:

unique un-installation data, e.g. identifying software to be un-installed and the device from which it is being un-installed and possibly other seed data, is assembled by the threat-monitoring system;

The un-installation data is then processed with one way function, such as a cryptographic hashing algorithm, to generate an output value;

the output value is then encrypted by the threat-monitoring system using the public key of the software distribution manager and licensing system;

the encrypted output value is then transmitted to the software distribution manager and licensing system;

the software is then uninstalled, e.g. either by deletion of all or part of the licensing information or by updating a flag that a licence has been revoked on the threat-monitoring system.

The software distribution manager and licensing system then performs authentication of the received un-installation message from the threat-monitoring system as follows:

the software distribution manager and licensing system decrypts the received un-installation message using its private key of the public/private key pair to reveal the plaintext of the output value. This should match the output that is expected to have been generated by the un-installation algorithm;

to test this, the software distribution manager and licensing system performs the same one-way calculation on the basis of a stored value of the unique un-installation data corresponding to the particular threat-monitoring system and the particular item of software to be un-installed.

This value is then be compared with the received output value.

Using a hashing algorithm in this manner to provide protection is an example of a "cryptographic hashing technique" referred to herein.

In the event that the un-install message that is received is verified by the software distribution manager and licensing system, it notifies the billing system, which is triggered to cease billing at step 520.

As will be appreciated by those skilled in the art, the public key required to encrypt the un-install data can be provided to the threat-monitoring system along with the licence data and software program at the initial download stage.

This automatic payment process does not require the software distribution manager and licensing system to transmit any sort of un-install command or confirmation of un-installation back to the threat-monitoring system to disable the downloaded software. By omitting this requirement, this prevents an attack on the threat-monitoring system in which a third party could transmits false un-install commands or confirmation to the threat-monitoring system, thereby causing disablement of important software components.

It should also be noted that due to the life safety or other performance critical (e.g. security) aspect of operation of such systems, it is additionally advantageous in all examples to require that all software stored in the auxiliary software memory 110 and run on the threat-monitoring system to be approved by the manufacturer, distributor or other authority concerned with the operation of such devices and be digitally signed by that party. This ensures that any auxiliary software loaded onto the threat-monitoring system to perform additional functions is compatible with the standards approved software 112 and does not interfere with this operation.

Should the user of the threat-monitoring system choose to de-install software, this may be permitted. However, it should be noted that de-installation of the software should only be allowed for software which is not required for standards compliant operation of the threat-monitoring system. Accordingly, the threat-monitoring system may include protections to prevent de-installation of approved software if a user is seeking to de-install auxiliary function software.

Credit Tokens

In the above descriptions of Process 1, 2 and 3, a request for new software results in a billing event and subsequent generation of a licence. The billing event can be performed in any known ways, for example it may constitute charging a credit card, directly debiting a bank account or generating an invoice for later payment, a cash payment or the like. Moreover the mechanism for making a performing the transaction could be any know mechanism. For example in some embodiments the purchase of software or a license could be performed in a face-to-face transaction at a point of sale, or it may be an e-commerce transaction e.g. using a website, or payment via other type of payment system. In some examples the billing event can be disconnected form the software or license purchase process by replacing the financial transaction with a credit consumption event in which a pre-purchased "credit token" is consumed. The credit token can be associated with a dollar value, or in one embodiment, can identify that payment has been made in respect of one or more application licences for one or more auxiliary software functions or software upgrades. In the latter case, the associated licence may be a time-limited licence or a perpetual (time-unlimited) licence.

In this example a user can purchase the credit token from the software or device manufacturer, a distributor or retailer of the threat-monitoring system or software provider e.g. in person or via a website, or purchase in a dedicated application, or other sales outlet that sells the token. In one arrangement, the manufacturer sells each credit token, in the form of a physical card, to a distributer, who then on-sells to credit token to the user. Printed on the credit token is a private code, such as a credit number, or other code, that identifies the credit token and optionally the type of application licence(s). The credit number is a "private" code because it is viewable only by the end user. This is achieved by hiding the code from public view by sealing the item in an envelope or by covering the code with a tamper-proof or tamper-evident covering, such as used on scratch cards. This prevents another party from viewing and consuming the credit token before the user has been able to perform the software upgrade or at least allows the purchaser to know if there has been tampering with the token.

Figure 6:
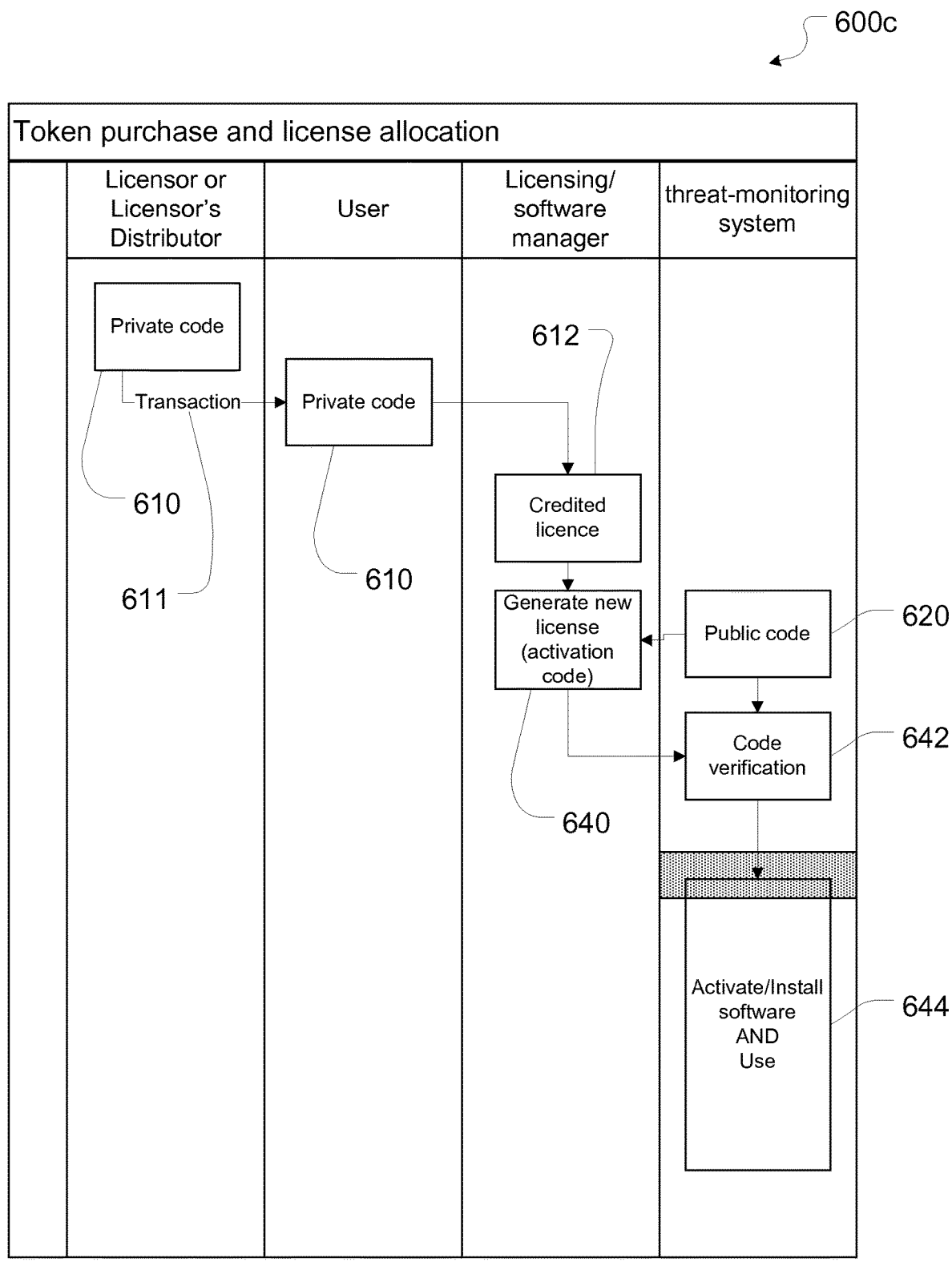
FIG. 6 illustrates a process for licence crediting and allocation process in accordance with an embodiment of the invention, which also includes a process for token purchase.

A process by which a user purchases a credit token and then consumes the token is illustrated in FIG. 6 by process 600. The process 600 begins in this example with a licensor or their distributor or reseller possessing a valid credit token 610. At step 611 a user purchases the token from the seller. This could be an online transaction which causes a physical media representing the token to be delivered to the user, or be an online transaction that enables the secure electronic transfer of data representing the token to be transmitted to the user. The transaction may also be conducted in person and result in the provision of a physical token, such as a plastic card (e.g. like a transaction or credit card sized card) in exchange for payment.

In the consumption part of the process 600, the user then accesses a licensing server, via a the software licensing program running on their computing device e.g. terminal 210 or via a website, and enters the private code 610 associated with the token that they purchased to link the credit token with their account as a credited license and subsequently to allow the licence(s) to be consumed by allocating the licence(s) to a software item running on a threat-monitoring system(s). It is appreciated that as an alternative to using a credit token, a credited licence 612 may be obtained by some other billing event 611, such as a direct debit or credit card payment.

Licence Allocation and Management

The licence allocation may be achieved by using a program or website that interacts with the licensing and software management server. In the case of a website, the same website can be used to apply the credit token to the licensee's account or to set up an alternative payment method for the licence(s) and to manage re-allocation of licences from one hardware system to another.

Figure 6A:
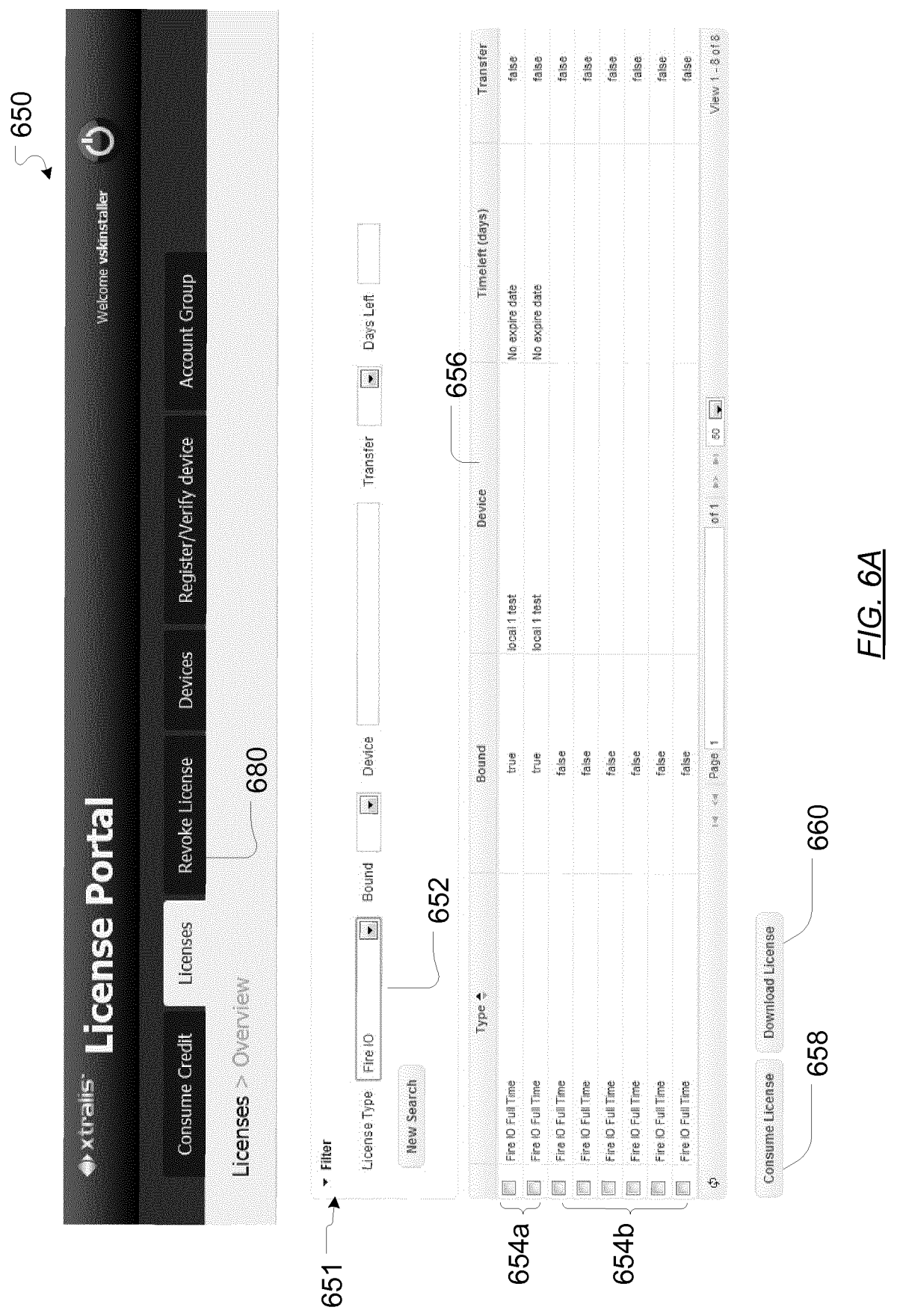

Upon logging on to the website, the user is able to view a webpage that lists their existing licence pool (including any newly credited licences) and any devices previously known or subsequently added to the account. FIG. 6a illustrates and example of such a webpage 650. As the user may have a variety of different licences, the webpage includes filter 651 to show only licences of interest. The filter includes a licence type selector in the form of a drop down menu 652. In this example, the licence type "Fire IO" has been selected. The user may additionally, or alternatively, filter the displayed licences to show (i) devices that are either bound (allocated) to a device, or unbound; (ii) all licences bound to a particular device; (iii) all devices that are in "transfer mode" (see below) and/or (iv) all licences that have (or are within) a certain number of days before expiry. FIG. 6a shows eight licences 654a, 654b of the type "Fire IO". The top two displayed licences 654a are listed as being bound to device "local 1 test", with no expiry date on the licence (i.e. they are perpetual licences).

A user consumes a credited licence by selecting a specific credited but unallocated licence 612, 654b and a specific device, and binding that licence to that device in step 640.

To bind the licence to a device, the user accesses interface 650 and enters onto the interface a unique identifier 620 associated with the selected device. The user also selects a licence, from a list of available licences, to be bound to the selected device. The unique identifier may be a public code such as a MAC address, other serial number, or like identifier associated with the device. This may be achieved by entering the device's identifier in the "Device" column 656 for a given unallocated licence 654b. The device identifier may be either manually typed or selected by choosing from a list of known devices or similar known selection interface. Alternatively, the device ID may be selected indirectly by selecting the device according to a user-attributed name given to the device and which is associated with the device ID.

Once a device has been associated with an allocated licence, a user clicks a "Consume License" icon 658. The licensing server then locks the licence to that device by generating an activation code 640 in which the unique identifier of the device is encoded, by encryption, and the licence type is identified. Such an activation code or file acts is non-limiting example as an "activation tool", as referred to herein. The activation code generated in step 640 resides in a file and needs to be provided to the device to activate the licence. The provision of the activation code to the device may be performed on-line by downloading it from the server, by clicking a "Download License" icon 660. It also may be placed on physical computer readable media, e.g. flash drive or other solid state memory, CD or DVD or other memory. In some cases the activation code may be humanly readable, and provided electronically or in hard copy so that it may be manually entered onto the device via a user interface associated with the device.

Figure 6B:
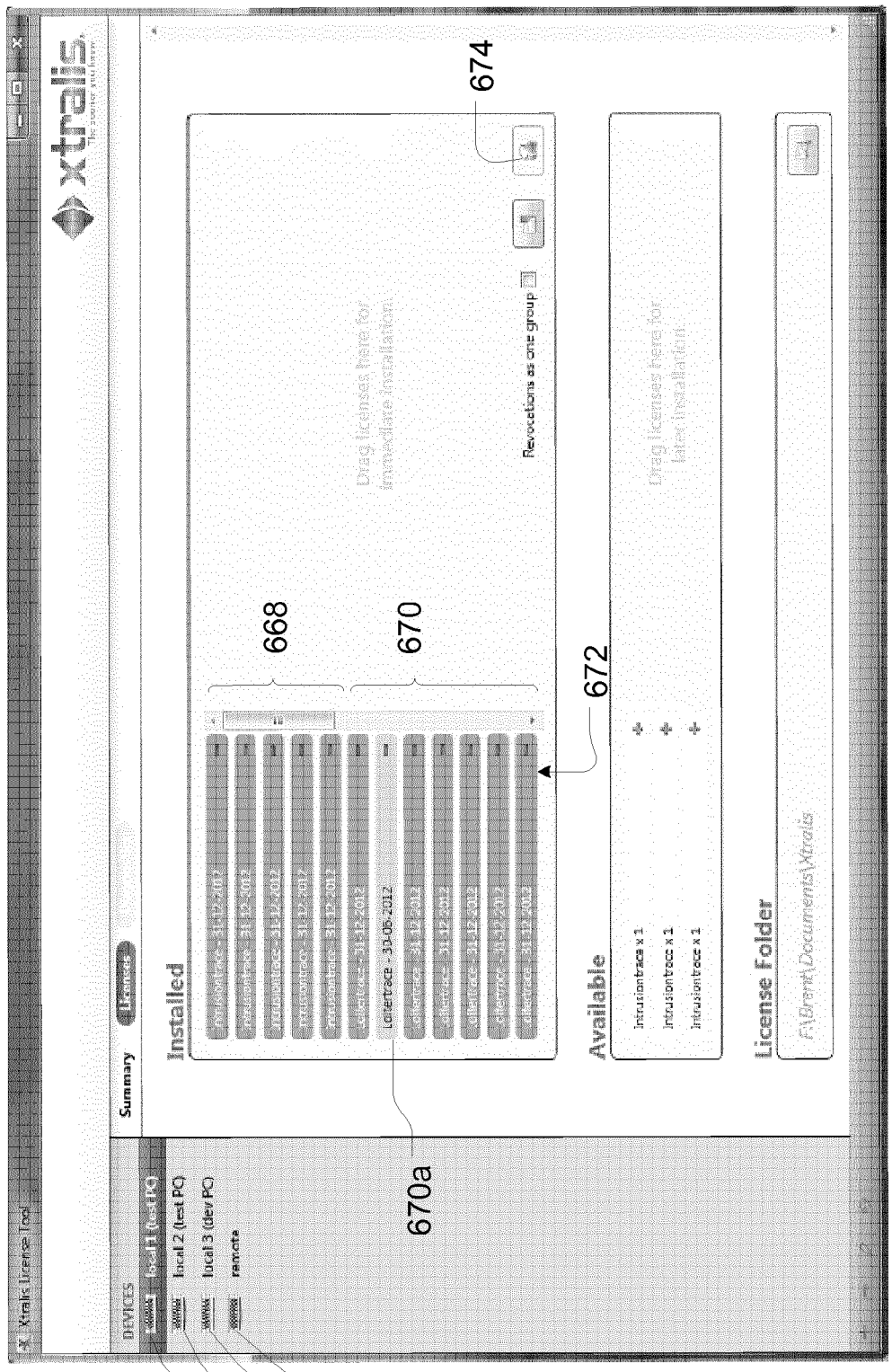
FIG. 6b illustrates a user interface for managing licences on a threat-monitoring system.

At step 642, the device decrypts the encrypted unique identifier and verifies that it matches the actual unique identifier of the device. If the identifier is verified as being correct, the device then activates the functionality associated with the licence at step 644. In step 644, the device recognises that a new licence type has been added. If the required software is already present on the device 644, the device enables the software to which the licence type relates. However, if the software associated with the license type is recognised as being absent on the device, the device 644 downloads and installs the software from an acting software management system 200, 212 or 210, or sends a message to terminal 210 or control system 212, requesting a copy of the latest software. In another embodiment, the terminal 210 or control system 212 knows in advance whether the software version on threat-monitoring system is recent enough to support the added functionality, and can upload a newer version of the software if an updated version of the software is required. FIG. 6b illustrates a user interface 662 accessed on a computing system, functionally equivalent to control system 212 or terminal 210 of FIG. 1, but configured to manage licences on four threat-monitoring systems, i.e. devices 665a, 655b, which include three local devices and one remote device. In FIG. 6b, the user interface displays the licences allocated to software installed on a selected device, "local 1 (test PC)" 665a.

In this example, device 665a has numerous items of licensed software installed. The snap shot in FIG. 6b of user interface shows 662 shows five licences 668 of type "A" and seven licences 670 of type "B", each type licence A and B corresponding to different kinds of auxiliary software functions for that device. In this example, multiple licences of applications of each type have been allocated to the one device because the device has multiple channels, each of which can be configured for different functions by activating the necessary software in respect of each channel. This is because certain auxiliary functions may be required on some channels, but not others. Accordingly, a user can save costs by obtaining a tailored licence for each auxiliary function (or a set of functions), for each channel, so that they are only paying for the functionality that they require. As an example, a video-based security system may have five video channels with licences that allow certain video motion detection software to be run on them so as to detect any movement in a high security area in which little or no traffic is normally expected. Seven further channels may be licensed to run software to perform "zero-motion" detection functionality for monitoring for unexpected stationary items (e.g. dropped packages etc.) in areas that have a high level of traffic. In other cases, a given channel may be licensed to have more than one software type used on it. Of course, some licences may only need to be installed once, as the device may have only one channel, or the device may provide functionality for all channels.

Returning to FIG. 6b, user interface 662 displays whether each licence is valid (i.e. active and running) or expired by shading or colouring each licence according to its status. In the illustrated snap-shot, licence 670a is expired, but all other licences 668, 670 are active.

Once the activation code is provided to the device in step 650 the device verifies the activation code, at step 650, by attempting to decode the expected public code, e.g. its serial number, and extracts the licence type. The device checks that that the decoded public code matches the expected code associated with the device. If the number is correct, then the software corresponding to the extracted licence type is installed (or un-locked if the software is already installed) at step 660.

As an alternative to using a website, the interfaces illustrated in FIGS. 6a and 6b, may be provided by a software application running on a computing device 210, 212, which is in communication with a threat-monitoring system 100 (a,b,c) and the software management system 200.

Figure 7:
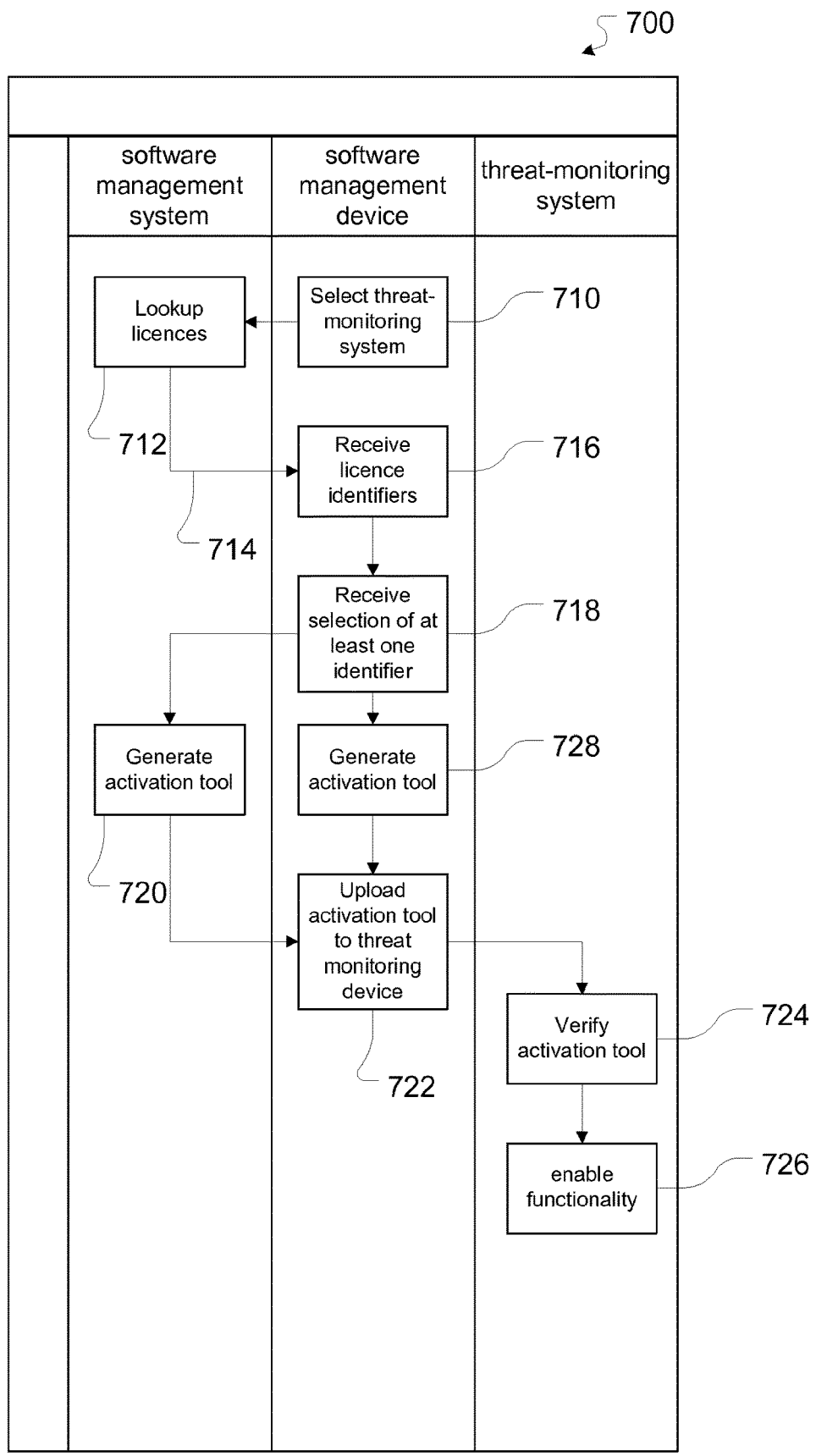
FIG. 7 illustrates a process for managing software of a threat monitoring system in accordance with the an aspect of the present invention.

FIG. 7 illustrates a process 700 by which a licence is used to activate additional functionality on a threat-monitoring device, using the software application on a computing device 210, 212. For convenience the will now be described in relation to the computing device being terminal 210, though it may also be performed by central control system 212.

At step 710, a technician operating the terminal 210 selects a specific threat monitoring system for which the additional functionality is required. The specific system may be selected from a list that is sent to the terminal 210 by the software management system upon logging into the relevant user's account. Alternatively the device ID of the threat monitoring system may be manually entered or read from the monitoring system itself. The ID of the selected system is transmitted to the software management system 200. At step 712 the software management system looks up the licences that are registered to the user and which relate to functionality that may be provided to the selected monitoring system. The list of licences is then sent to the terminal 210 at step 714 and received by the terminal at step 716.

Figure 8:
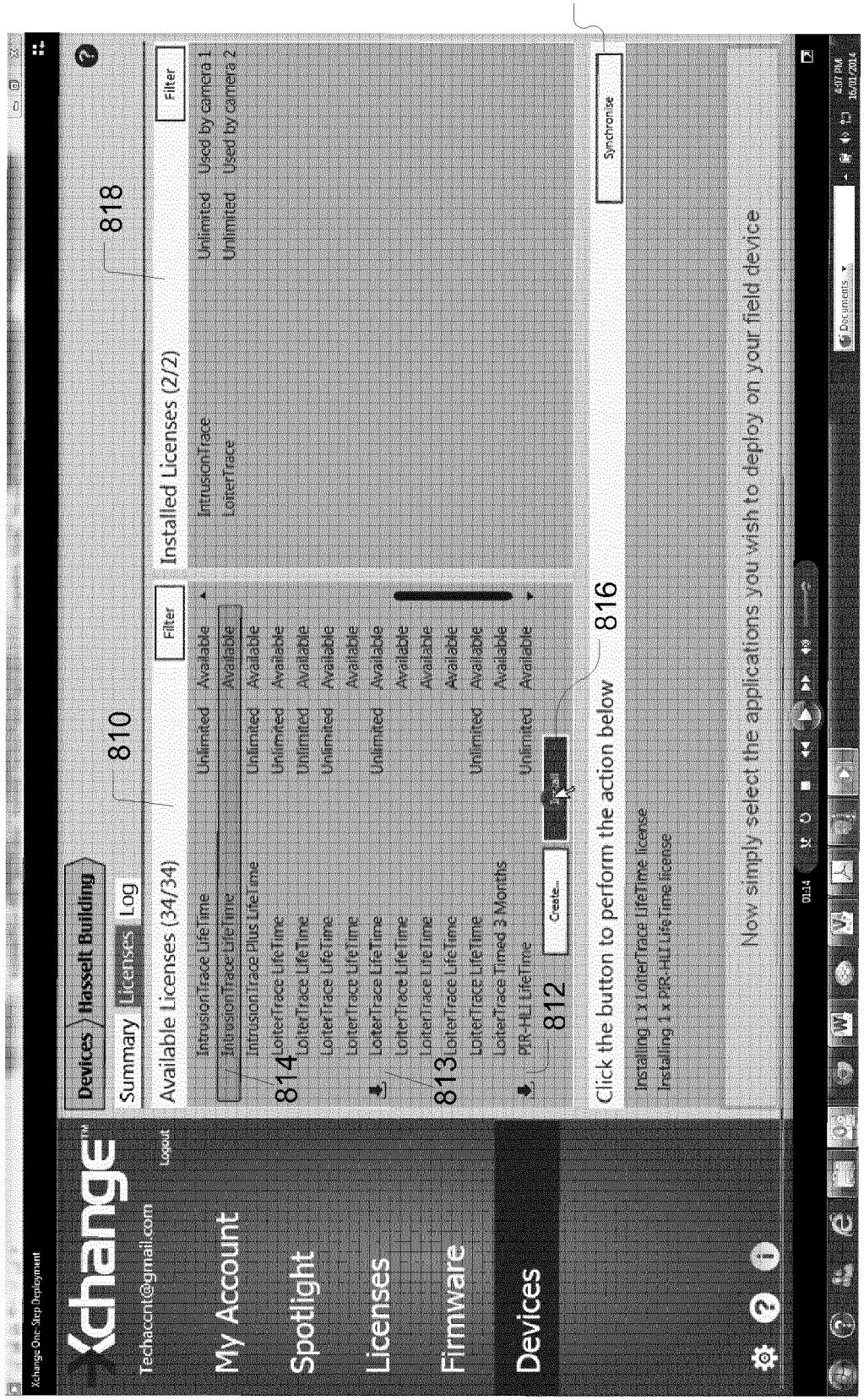
FIG. 8 illustrates a graphical user interface used by a computing system when managing software in an embodiment of the present invention.

FIG. 8 illustrates a graphical user interface generated by a software management application running on the terminal 210. The terminal 210 displays the list of available licences in a first column 810 of the GUI. The technician can then select one or more of the licences to be assigned to the threat-monitoring system. FIG. 8 indicates two licences 812, 813 have been tagged by the technician. A third licence 814 is marked and will become tagged as well, upon clicking on the "install" icon 816. A second column 818 lists the licences (if any) that are already installed on the threat-monitoring system. The operational functions of the threat monitoring system that are governed by the selected tagged licences will be enabled by a single interaction of the technician thereafter. Specifically, the technician clicks on the 'synchronise' icon 820, which triggers the chain of events which will now be described, Returning to FIG. 7, the terminal received the selection of licences at step 718. Upon receiving the selection, the terminal sends the selected licence (or if multiple licences were selected, then the list of selected licences) to the software management system 200. At step 720, the software management system then generates the activation tool, in the form of a licence file, in the manner that has been already described and sends the file to the terminal 210. The terminal 210 then, at step 722, uploads the licence file to the threat-monitoring system corresponding to the device ID. At step 724, the threat-monitoring system verifies the authenticity of the file (e.g. in accordance with a cryptographic hashing technique) and/or decrypts the data in the file, depending on the form of data protection employed by the process 700. This process also includes verification that the encoded unique ID in the file corresponds to its own unique ID. If this is the case, then at step 726, the threat-monitoring system will place itself into a state that supports the functionality associated with the licence.

The threat-monitoring system then sends a message (not shown) to the terminal 210 to confirm that the upgrade has been completed, the terminal then forwarding this information to the software management system 200. Upon completion of this process, the GUI on the terminal displays an updated list of the available licences and the licences now installed on the threat-monitoring device to update the user account records. Accordingly the list of available licences will be reduced by the number of previously selected licences, and the list of installed licences will be increased by the number of previously selected licences.

Start-Up Licences

In some situations, the terminal 210 may not have access to the software management system 200 when the installation is required. In a preferred form, because the terminal 210 is operating using a dedicated software licensing application, rather than via a web interface, the technician is still able to perform a process for allocating a license to the system. In this case the technician selects the licenses from a plurality of licences that can be used for temporary use only because these licences are "open" licences because they are not linked with the customer's account. In this case, the activation tool is generated by the terminal 210 at step 728, rather than the software management system 200.

The list of such licences available to the customer are limited in number, and once a given licence type has been used for a given threat-monitoring system, further start-up licences of that type will not function on (and/or cannot be deployed to) that threat monitoring system.

An exemplary flow of how new service start-up licenses come into existence and the deployment steps and limitations is described below.

Whenever the software provider activates a new application on the software management system 200, all software management devices 210, 212 used by the installers, which are connected to the internet, will fetch and store the new application data automatically.

At that point the new application will become available in the 'start-up license' menu of the software management devices 210, 212.

Once the new application is available within the license tool the installer can generate one or multiple service licenses for a threat-monitoring system.

Once these start-up licenses are deployed for the first time on a given threat-monitoring system, a timer/start-up period of 30 days is initiated on the threat-monitoring system.

During these 30 days more service licenses can be generated and deployed on the threat-monitoring system. The timer however will keep on running and the new licenses will only be active for the remainder of the 30 days Every day or whenever the configuration of the field unit is being changed, the threat-monitoring system will send a notification message to the installer's software management device (e.g. terminal 210) to inform the technician that there are licenses that will expire At the end of the 30 day start-up period on the threat-monitoring system all start-up licenses will be deactivated and a final notification message to terminal 210 will be sent to signal the deactivation.

Within the 30 day start-up period the technician will replace the start-up licenses with real account licenses. This replacement can be done in one action by selecting the start-up license and selecting its replacement license. No further configuration steps are required.

Once the start-up period of 30 days has passed, that threat-monitoring system will never allow the initiation of a new start-up period.

In Process 3, a method for revoking a licence was described. Although that method was described in the context of a periodic billing payment scheme, the revocation method may also be used for a perpetual licence (Process 1) or a time-limited licence (Process 2), or any other revocation method described herein. If the licence is still valid it may then be deployed elsewhere.

The revocation process is also effected via user interface 662. A user revokes a licence by clicking on a minus (−) symbol located on the right hand side of each listed licence 668, 670, and then clicking an "apply changes" icon 674. This generates a revocation file which contains the encrypted output value discussed above, in reference to Process 3. The file is then uploaded onto the software management/licensing website by firstly selecting the "Revoke Licence" page tab 680 on web page 650, and then selecting the revocation file to upload. However, in a particularly advantageous method, a computing device 210, 212 is configured, using a software application, to upload the revocation file directly from the threat-monitoring device.

In particular the computing device 210, 212 is configured to receiving a plurality of licence identifiers identifying respective licences that are assigned to a threat monitoring system. These licence identifiers may be read by from the monitoring system itself or from the software managements system 200. A technician selects at least one of the licence identifiers. The computing device 210, 212 then transmits a request to the threat-monitoring system to un-install software corresponding to the selected at least one of the licence identifiers. The software is uninstalled using a method already described, wherein the computing system 210, 212 receives, from the threat monitoring system, uninstall-data for verifying that the software has been un-installed. The verification can be performed by the computing device 210, 212, but is preferably forwarded to be verified by the software management system 200. since it the software management 200 that holds the central records of the user's account. Upon verifying the uninstallation, the software management system 200 frees up the corresponding licence so that it can be used by another threat-monitoring system, when required. Once the licence allocation/software management server has verified that the licence has been revoked from the device to which it was originally assigned, the licence (if still valid) will re-appear in the licence pool for the user's account. The licence can then be re-assigned to a different device by licence consumption process described above.

In some circumstances it may not be possible, at a given time, to obtain a revocation file, or there may be no communication available between the computing device 210, 212 and the software management server 200 having the user's current account details. However, an assigned licence may urgently be needed to be transferred to another device. For example, the device to which licences are assigned by be faulty or inaccessible. This transferring of licences can be achieved by copying all licences bound to the faulty/inaccessible device to another device. A grace period will then be provided whereby the software management system will allow the licences to operate on the second devices for a limited time, even though no revocation file has been uploaded to disassociate the licences from the faulty/inaccessible device. After the grace period has expired an alert is generated to notify an administrator of the software management system who may then manually intervene. Until the revocation file is uploaded, the device from which these licences were transferred will be put in 'Transfer Mode'. The software management system or administrator of that system then has the option to block the user's account if a device (or certain number of devices) are kept in transfer mode for longer than the grace period.

Whenever a license is in an 'in transfer' state, within a certain time period the corresponding licenses have to be revoked from the original threat-monitoring system and proof of that has to be imported to the user's account. This revocation can be done by the technician/installer whenever he can access the threat-monitoring system again or in case it is a faulty threat-monitoring system, a can repair centre take care of the revocation process.

There are also a limited amount of transfers can be performed on an account. The limit of the amount of transferrable licenses is calculated as a function of the total amount of licenses managed on that account. The more licenses managed, the more licenses that can be transferred at any given time. Whenever an installer tries to transfer too many licenses the account may optionally be locked.

The transfer-mode of operation can be effected by the computing device 210, 212 by: receiving one or more licence identifiers identifying respective licences available for assignment to a first threat monitoring system; and uploading, to the first threat monitoring system, an activation tool for activating at least one operational function of the first threat monitoring system, the at least one operational function corresponding to the one or more licence identifiers. In the event that the one or more licence identifiers are already assigned to a second threat monitoring system, the method further includes generating an alert unless, at the expiry of a specific time limit, software corresponding to the one or more licence identifiers has been verified to have been uninstalled from second threat monitoring system.

For example, in practice, the technician may select one threat-monitoring system (the "second" threat monitoring system referred to above) from a GUI on the computing device 210, 212. The technician selects another device (the "first" threat monitoring system referred to above) to which all licences are to be transferred. Because the licences have not yet been revoked from the second threat monitoring system an alert starts a timer, by the expiry of which an alert is generated by the computing device 210, 212 and/or monitoring system 200 to inform the technician, distributor and/or manufacturer, so that appropriate action may be taken. The alert may additionally or alternatively be used by the software management system to automatically block the associated account.

In general, the above software management methods and devices address challenges that arise whenever a new service needs to be deployed very quickly on a field device or for one reason or the other the technician commissioning the system hasn't prepared the appropriate service licence for the field unit and doesn't have access to the internet to do so. Typically at that point the new service needs to be ordered and delivered before it can be commissioned or the technician has to go back to the office and prepare all licenses before going back on site. This introduces a delay and higher cost in the deployment of the new service.

Various embodiments described address challenges associated with of a technician's reliance on the distributor, who controls licences for new software on the field unit. For example, in a previous licence installation method, the installer had to first request a licence file for the new service from the distributor and send the distributor a unique ID for the field unit. The distributor then needed to manually enter the unique ID into a program that generates a licence file to activate the new service. The file would then be sent to the distributor to manually upload the file to the field unit. Such a method is a time consuming process, and prevents the technician from servicing a customer instantaneously and independently from the distributor. Furthermore, if the unique ID is wrong or is incorrectly entered, the licence file would not work and a new licence file would need to be requested.

Using various embodiments of the invention described herein the a technician/installer has the ability to generate and install a licence file (at least a temporary licence file), without having to depend on the distributor of the threat-monitoring system. Furthermore, the installation of the licence file onto the threat monitoring system may be simplified. For example, using features described herein, if the computing device has internet access to the licensing server and is also in communication (locally or remotely) with the threat-monitoring system, the installer can generate a full-licence file specific to the threat-monitoring system and upload the file to the threat-monitoring device in one action. The "one action" ability is partly provided by the ability to upload the file from the computing device to the threat-monitoring system, and partly due to the ability of the technician to generate a licence file independently from the distributor.

If the technician's computing device is offline from the licensing server at the time of installation, then technician can at least generate a temporary, start-up licence, or can install a full-licence file that he has previously generated when there was communication with the licensing server. If a start-up licence is installed by the technician, the technician can later generate a full-licence file when they eventually gain communication access to the licencing server. They can then replace the start-up licence with the full-licence on the monitoring system by uploading the full licence from their computing device to the monitoring system. The uploading can be achieved remotely (if the monitoring system is connected to the internet) or by visiting the site (if the monitoring system does not have an internet connection). The technician also has greater control to create licences because they have access to unallocated full-licences which they can assign, revoke or transfer to/from selected monitoring systems as required. Further, they can partially transfer licences even in the absence of an internet connection to the licencing server, and can later complete or verify the transfer at a later time, when internet connectivity becomes available.

Software Upgrade Process

Figure 9:
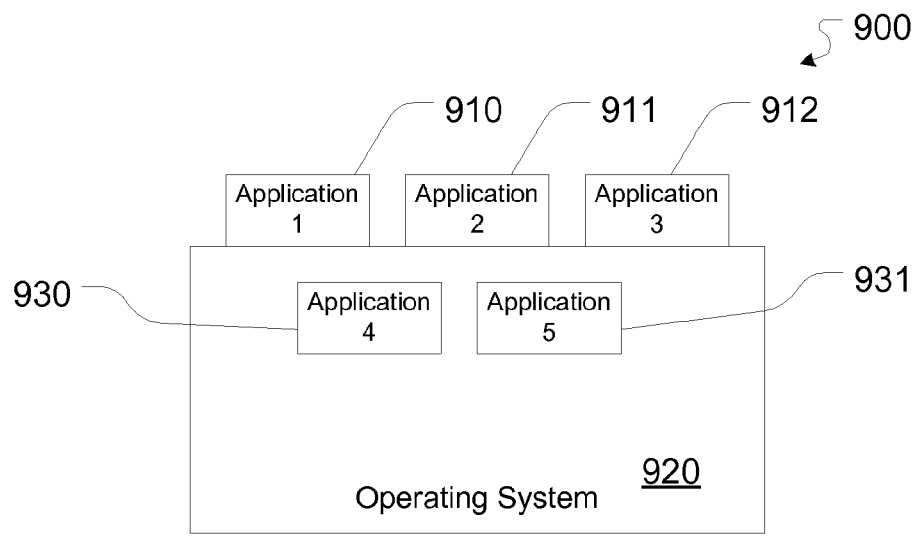
FIG. 9 illustrates a software suite, representing the software on a threat-monitoring system, the software being structured as software modules and an operating system.

In some embodiments the software stored in the memory of the threat-monitoring system will be written such that it is modular in structure and additional functionality can be added by providing auxiliary software as additional software modules implementing that functionality. Such an arrangement is represented diagrammatically in FIG. 9 for the threat-monitoring system's software suite (comprised of approved software 112 and, optionally, auxiliary function software 110, referred to in FIG. 1). The additional software modules 910, 911 and 912 may added after initial installation (or configuration) of the operating system 920 of the threat-monitoring system, or they may present at installation and either upgraded or enabled some time after the initial installation. The addition, upgrade or enabling of the modules 910, 911 and 912 can be effected without having to upgrade the underlying operating system 920. The software 900 may also include modules 930, 931 which are embedded in, or intrinsically tied, to the specific operating system 920. Thus, modules 930, 931 can only be upgraded by upgrading the operating system 920.

Figure 10:
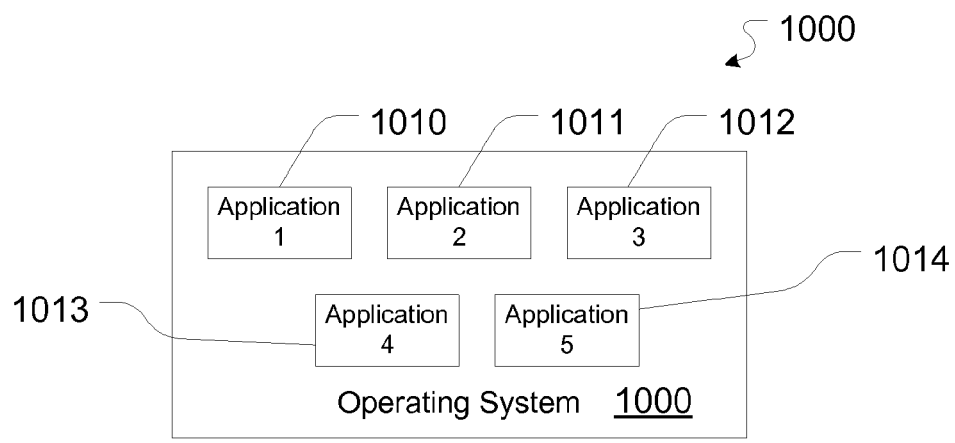
FIG. 10 illustrates another embodiment of software suite for a threat-monitoring system.

In other situations, such as illustrated in FIG. 10, all modules 1010-1014 are tied to, or integrated within, the operating system 1010. In such cases it will be necessary to upgrade all software 1000 on the device in order to upgrade any part of the software stored in the threat-monitoring system.

In order to guard against system malfunction caused by a software upgrade, it can be advantageous to store a previous version of software (e.g. either the last known functioning software or original default approved software) in memory in order to allow the 'roll back' an installation of a software upgrade, such that the detector can return to its previous operating state before the update. Alternatively, the roll back position may be to an underlying 'standards approved' set of software which is stored in the approved software section of memory.

In the embodiments described above a software upgrade process is described as a stand-alone event. However this may not always be the case. In some cases a hardware upgrade may also be performed along with a software upgrade, or necessitate acquisition of new software instructions. One example of this might be the addition of a VESDA ECO gas detection system to an aspirating smoke detection system such as a VESDA smoke detector (both produced by Xtralis Pty Ltd). In addition to using the VESDA ECO as a stand-alone monitoring system, it may be desirable to update the VESDA software so that it can process the gas sensing output of the VESDA ECO gas detector and its own particle detection measurements using downloaded software comprising a set of hybrid alarm criteria which uses both gas and smoke detection to determine the presence of a fire or other threat.

Upon installation of new hardware or software to a threat-monitoring system it may be necessary to update software in either the added hardware, the original hardware, or hardware on associated systems to take full advantage of the new software or hardware's capabilities. For example new software instructions may be uploaded to control systems for the fire alarm control panel, building HVAC system and smoke detector to enable a more intelligent emergency response to detected conditions using multiple systems which are upgraded in concert with each other. In another embodiment, new software instructions may be required to activate operation of software for operating additional video channels that may be added to a video surveillance system.

It will be understood that the present invention can be implemented using an network enabled threat-monitoring system. However where the software upgrade relates to a corresponding hardware upgrade it may not be suitable or necessary in all embodiments to provide (or use) such connectivity to transfer software or licenses to the device. In such cases it may be necessary or desirable to use physical media, such as flash memory or data disk or other computer readable data storage device to deliver software or licensing data to the threat-monitoring system.

Moreover, it will be understood that embodiments herein can be used to provide software to a threat-monitoring system either with licenses or entirely independently therefrom. For example a suite of new software applications may be delivered to a threat-monitoring system by physical media by a technician during a maintenance call. Such software can be left inactive (i.e. unlicensed) until an embodiment of the present invention is used to acquire a licence to activate one of the applications or functions of the suite of software previously installed. Conversely software may be bought and downloaded in the field using some embodiments to provide immediate access to upgraded software using embodiments of the present invention.

Hardware functionality may be expanded in a controlled manner by a specific configuration of the threat monitoring system. The threat monitoring system is configured to receive encrypted licence data (e.g. as a file) including an hardware identification number. The licence data includes a type parameter for indicating a licenced operational function associated with the item of hardware. The licence data also includes operational parameters for using the item of hardware.

The threat-monitoring system is also configured to read a unique identification number from an item of hardware that has been added to it to expand its the functionality. The hardware identifier is also encrypted.

The encryption is in accordance with Advanced Encryption Standard AES 256. However, as alternative (or in addition) to encryption, the licence data and hardware data may be protected from tampering in other ways, for example by employing a cryptographic hashing technique, for example as has been exemplified herein.

The threat monitoring system receives the license data, processes it and adds it to the threat monitoring system's encrypted (AES256) system license repository. The extension hardware itself is then effectively installed in the threat-monitoring system.

In the event that the hardware identification number matches the unique identifier, the threat-monitoring system generates a permission parameter, which activates the hardware extension. If there is not a match, the hardware extension will not be activated and cannot be used.

Using this method, it is possible to install the hardware extension's license file on multiple platforms. However, since only one specific item of hardware can provide the correctly matching identification number, the hardware extension can only be active in threat-monitoring system at a time.

In the example of a video surveillance system, referred to above, the extension hardware may be provided in a kit. For example, the kit may include:

An analog video capture card (4 channel, 8 channel or 16 channel) and

A card software license, provided on a Universal Serial Bus (USB) stick or other memory storage device.

Referring to the system in FIG. 2, in the case where the threat-monitoring system 100 is a video-monitoring system, the analog video capture card (not shown) has a hardware interface for connecting and communicating with controller 102. For example, the hardware interface may be a Peripheral Component Interconnect (PCI) connector that plugs into a PCI slot on a printed circuit board that forms part at least part of the controller 102. To install the licence data, the memory storage device (not shown) storing the licence data is connected the external communication interface 114 of the threat-monitoring system.

A central processing unit (CPU) of the controller 102 reads the licence data from the memory storage device. Alternatively, the licence data may be loaded onto terminal 210 or central control system 212 and sent to the threat-monitoring system either locally or remotely. In the latter case, the licence data is received by the controller 102 via a TCP or other suitable communications port provided by communication module 114.

Upon receiving the licence data, the CPU processes it as described above, storing the decrypted data in a memory system to add it to the licence repository in the threat-monitoring system. The CPU reads the unique hardware ID from the video capture card, and performs the method described above to activate the additional functionality if the unique hardware ID of the video capture card is listed in the repository.

The analog video capture card may include audio/visual connectors, with the threat monitoring system and video capture card being configured such that, upon installation, the audio-visual connectors are accessible from outside the casing of the threat-monitoring system. However, in other embodiments, further hardware may be included to enable the connector access location to be at a position that is separated from the video-capture card. For example, the kit mat also include one or more audio-visual connector cards, which each have at least one audio/visual connector (e.g. 4 connectors in the case of a 4 channel video extension) and at least one connector for connecting to the video capture card. In this case, the kit may further comprise at least one cable (e.g. one cable, such a ribbon cable, per connector card) for connecting the capture card to the connector card(s). The kit may further include a sticker set for labelling the capture card on its user-accessible side, and/or tie-wraps to position and secure the cables provided with the kit.

In other exemplary embodiments, as applied to video monitoring systems or other threat-monitoring system, other extended functionality may be provided. This may be achieved by employing an alternative hardware extension cards in place of the video capture card.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method implemented on a computing device to manage software in threat-monitoring systems, the method comprising:
receiving at the computing device licence identifiers identifying respective licences that are assigned to a threat monitoring system managed by the computing device, the threat monitoring system being remote from the computing device;
receiving at the computing device a selection of at least one of the licence identifiers;
determining, by the computing device, whether the selected at least one of the licence identifiers relates to approved software necessary for correct operation of a controller that receives and processes data pertaining to a condition being monitored by the threat monitoring system, the controller being included with the threat monitoring system that is remote from the computing device;
transmitting, from the computing device, a request to the threat-monitoring system to un-install non-approved software that is currently installed at the threat monitoring system, the non-approved software corresponding to the selected at least one of the licence identifiers;
receiving, from the threat monitoring system, uninstall-data for verifying that the non-approved software has been un-installed, wherein the uninstall-data includes a value generated by a hashing algorithm utilized by the threat monitoring system, the uninstall-data is encrypted using a public key shared by the threat monitoring system and the computing device; and
verifying, by the computing device, that the uninstallation has been performed based at least in part on a decryption of the uninstall data, wherein verifying, by the computing device, that the uninstallation has been performed further includes decrypting the uninstall-data using a private key associated with the computing device and determining that the decrypted uninstall-data matches a particular value expected to be generated by the hashing algorithm.

2. The method as claimed in claim 1, wherein the method further includes:
transmitting the un-install data to a software management server.

3. The method as claimed in claim 1, wherein the method includes protecting the transmitted un-install data, by either one or both of:
encrypting said un-install data; or
using a cryptographic hashing technique.

4. The method as claimed in claim 1, wherein the method further includes transmitting data to a software management server to indicate that the software has been uninstalled.

5. The method as claimed in claim 1, wherein the method further includes:
re-assigning a licence corresponding to the uninstalled software to another threat-monitoring system.

6. The method as claimed in claim 5, wherein the re-assignment comprises:
- receiving a plurality of licence identifiers identifying respective licences available for assignment to a threat monitoring system;
- receiving a selection of at least one of the licence identifiers; and
- uploading, to the threat monitoring system, an activation tool for activating at least one operational function of the threat monitoring system, the at least one operational function corresponding to the selected at least one licence identifier.

7. The method as claimed in claim 1, wherein the approved software comprises any one or more of: software controlling interfaces, software required for standards-essential operation of the threat monitoring system, software required for standards-essential processing of sensor outputs, software required for processing of sensor outputs according to one or more minimum specified parameters, and software related to detection or notification of alarm or threat conditions.

8. A threat monitoring system, including a processor and a non-transitory computer-readable memory having instructions stored thereon which, when executed by the processor cause the system to perform the method according to claim 1.

9. A non-transitory computer-readable media storing thereon computer-executable instructions which, when executed by a computing device or system, configure the device or system to perform a method according to claim 1.

* * * * *